(12) United States Patent
Liu et al.

(10) Patent No.: US 11,969,896 B2
(45) Date of Patent: Apr. 30, 2024

(54) ROBOT SCHEDULING AND ROBOT PATH CONTROL METHOD, SERVER AND STORAGE MEDIUM

(71) Applicant: BEIJING GEEKPLUS TECHNOLOGY CO., LTD., Beijing (CN)

(72) Inventors: Kai Liu, Beijing (CN); Jun Liu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 592 days.

(21) Appl. No.: 17/252,282

(22) PCT Filed: Jun. 19, 2019

(86) PCT No.: PCT/CN2019/091920
§ 371 (c)(1),
(2) Date: Dec. 15, 2020

(87) PCT Pub. No.: WO2019/242652
PCT Pub. Date: Dec. 26, 2019

(65) Prior Publication Data
US 2021/0252705 A1    Aug. 19, 2021

(30) Foreign Application Priority Data

Jun. 21, 2018 (CN) .......................... 201810643118.4
Jul. 2, 2018 (CN) .......................... 201810708903.3
Jul. 17, 2018 (CN) .......................... 201810785131.3

(51) Int. Cl.
*B25J 9/16* (2006.01)
(52) U.S. Cl.
CPC ........... *B25J 9/1661* (2013.01); *B25J 9/1666* (2013.01); *B25J 9/1682* (2013.01)

(58) Field of Classification Search
CPC ...... B25J 9/1661; B25J 9/1666; B25J 9/1682; G05D 1/0214; G05D 1/0297; G05D 1/0268; G06Q 10/047
See application file for complete search history.

(56) References Cited

U.S. PATENT DOCUMENTS 5,974,348 A     10/1999  Rocks
9,513,627 B1 *  12/2016  Elazary ............ G05B 19/41895
(Continued)

FOREIGN PATENT DOCUMENTS

CN          1990197 A       7/2007
CN        102406998 A       4/2012
(Continued)

OTHER PUBLICATIONS

Chih-Hsiung Hu, et al., A framework for the selection of idle vehicle home locations in an automated guided vehicle system, International Journal of Production Research, 2000, pp. 543-562, vol. 38, No. 3.

(Continued)

*Primary Examiner* — Jonathan L Sample
*Assistant Examiner* — Mohammed Yousef Abuelhawa
(74) *Attorney, Agent, or Firm* — Bayramoglu Law Offices LLC

(57) ABSTRACT

Robot scheduling, robot path control and robot fire control methods and devices, a server and a storage medium are provided. The robot scheduling method includes: receiving a scheduling instruction; determining a working state and a current position of a robot in a working area in response to the scheduling instruction; wherein the working state comprises an idle state and a non-idle state; and when the working state of the robot is idle and the current position is outside a preset target range, scheduling the robot from the current position into the target range.

7 Claims, 13 Drawing Sheets

(56) References Cited

U.S. PATENT DOCUMENTS

| | | | |
|---|---|---|---|
| 2012/0143427 A1 | 6/2012 | Hoffman et al. | |
| 2012/0303180 A1* | 11/2012 | Wang | G05D 1/0282 701/2 |
| 2014/0365258 A1* | 12/2014 | Vestal | G05D 1/0297 901/1 |
| 2018/0075402 A1* | 3/2018 | Stadie | G05D 1/0297 |
| 2018/0333847 A1* | 11/2018 | Ma | G05D 1/0217 |
| 2019/0369620 A1* | 12/2019 | Zhou | A01D 34/008 |

FOREIGN PATENT DOCUMENTS

| | | |
|---|---|---|
| CN | 103873539 A | 6/2014 |
| CN | 104317293 A | 1/2015 |
| CN | 105224996 A | 1/2016 |
| CN | 105404231 A | 3/2016 |
| CN | 105446342 A | 3/2016 |
| CN | 105853085 A | 8/2016 |
| CN | 105858045 A | 8/2016 |
| CN | 106228302 A | 12/2016 |
| CN | 106355345 A | 1/2017 |
| CN | 106444588 A | 2/2017 |
| CN | 106514661 A | 3/2017 |
| CN | 106647734 A | 5/2017 |
| CN | 107025491 A | 8/2017 |
| CN | 107036618 A | 8/2017 |
| CN | 107092255 A | 8/2017 |
| CN | 107145153 A | 9/2017 |
| CN | 107515606 A | 12/2017 |
| CN | 107899957 A | 4/2018 |
| CN | 108646762 A | 10/2018 |
| CN | 108958241 A | 12/2018 |
| CN | 108960506 A | 12/2018 |
| JP | S61221807 A | 10/1986 |
| JP | H10161744 A | 6/1998 |
| JP | 11085278 A | 3/1999 |
| JP | 11085281 A | 3/1999 |
| JP | 2003044138 A | 2/2003 |
| JP | 2009541174 A | 11/2009 |
| JP | 2010176607 A | 8/2010 |
| JP | 2011128899 A | 6/2011 |
| JP | 6283753 B2 | 2/2018 |
| JP | 2021522618 A | 8/2021 |
| KR | 20160108706 A | 9/2016 |
| WO | 2017118316 A1 | 7/2017 |
| WO | 2018053100 A1 | 3/2018 |

OTHER PUBLICATIONS

Arnold L. Rosenberg, The Parking Problem for Finite-State Robots, Journal of Graph Algorithms and Applications, 2012, pp. 483-506, vol. 16, No. 2.

* cited by examiner

ROBOT SCHEDULING AND ROBOT PATH CONTROL METHOD, SERVER AND STORAGE MEDIUM

CROSS REFERENCES TO THE RELATED APPLICATIONS

The present application is a national phase entry under 35 U.S.C. § 371 of International Application No. PCT/CN2019/091920, filed on Jun. 19, 2019, which claims the priorities from Chinese Patent Application No. 201810708903,3 filed on Jul. 2, 2018, Chinese Patent Application No. 201810643118,4 filed on Jun. 21, 2018 and Chinese Patent Application No. 201810785131.3 filed on Jul. 17, 2018, with the China National Intellectual Property Administration, which are hereby incorporated by reference in their entirety.

TECHNICAL FIELD

The embodiments of the present application relate to the robot technology, for example, to a robot scheduling method, a robot path control method, a server and a storage medium.

BACKGROUND

The development of robot technology has brought new technologies and innovations to the logistics industry. The use of robots to replace a large number of workers can realize the automation in the logistics field, reduce the labor cost and promote the increase in productivity. The robot based sorting system in the related technology transforms the traditional sorting model of "person-to-goods" into the mode of "goods-to-person" by moving the robots to transfer goods to the preset worker positions, breaking the traditional goods sorting model and effectively improving the work efficiency.

Since most warehouses do not operate continuously for 24 hours a day, the robots need to be turned on and off every day. However, the robots may be randomly distributed in the warehouse. During turning on and off, there is a need to search the robots everywhere in the site or manually schedule the robots to the designated positions through a control terminal, that is, select a robot by the control terminal and determine the designated position corresponding to this robot, schedule this robot to the designated position, then select a next robot that needs to be scheduled, and repeat the above operations until all the robots in the site are scheduled to the designated positions. However, these two methods undoubtedly increase the usage cost and reduce the work efficiency of the staff.

In addition, many warehouse resources, such as robots, shelves, and two-dimensional codes on the warehouse floor, also require the irregular maintenance. Before the robot based sorting system is maintained, it is necessary to manually schedule the robots to the designated area to prevent the robots from blocking the two-dimensional codes on the floor or the shelves to be maintained, to facilitate the maintenance personnel for inspection and repair. However, the robots need to be manually scheduled before each time of maintenance, which will increase the operation and maintenance cost of the staff.

Some emergency situations may inevitably occur in the logistics warehouse, such as robot traffic accident and commodity falling, or there is a need to maintain the basic warehouse resources regularly, such as shelf inspection, and cleaning and replacement of the two-dimensional codes on the floor, etc.

The related technology uses a method of stopping all the operations of the robots in a certain area, which may affect the operations of other areas or the entire area. The motion mode of robots in the related technology cannot meet the business requirements of various upstream systems and the processing requirements of emergent scenarios, and cannot allow the operation and maintenance personnel to enter the warehouse safely and quickly to restore the production order without affecting the production. In the logistics field, the warehouses are places for centralized storage of materials. Once a fire occurs, the economic loss will be huge, the social impact will be large, and the consequence will be serious, Therefore, it is extremely important to do a good job in warehouse fire safety, ensure the safety of stored materials, and reduce the fire hazards.

In a warehouse, once a fire alarm occurs, all the robots will stop moving and the robots will be moved out of the fire engine access manually. However, the moving robots may continue its motion due to delay errors or cause the sudden accidents due to sudden braking. In addition, this way has the low efficiency, consumes a lot of time and manpower, and may affect the emergency rescue.

SUMMARY

The present application provides a robot scheduling method, a robot path control method, a server and a storage medium, so as to solve at least one of the above problems.

Embodiments of the present application provide a robot scheduling method. The method includes: receiving a scheduling instruction; determining a working state and a current position of a robot in a working area in response to the scheduling instruction; wherein the working state includes an idle state and a non-idle state; when the working state of the robot is the idle state and the current position is outside a preset target range, scheduling the robot from the current position into the target range.

Embodiments of the present application further provide a server. The server includes: at least one processor and a memory communicatively connected to the at least one processor. The memory stores instructions that can be executed by the at least one processor, and the instructions are executed by the at least one processor to enable the at least one processor to perform the method described in any one of the foregoing embodiments.

Embodiments of the present application further provide a storage medium storing the computer-executable instructions, where the computer-executable instructions are used to perform the method described in any one of the foregoing embodiments.

The embodiments of the present application propose a robot scheduling method, a server and a storage medium. At first, the working state of the robot and the current position of the robot are determined; where the working state includes: the idle state and the non-idle state; and when the working state of the robot is idle and the current position is outside the preset target range, the robot can be scheduled from the current position into the target range. That is, in the technical solution proposed by the embodiments of the present application, when the working state of the robot is idle and the current position is outside the preset target range, the robot can be scheduled into the designated area for collection, and the robot can be automatically scheduled to the designated area, thereby reducing the operation and maintenance cost and improving the work efficiency.

Embodiments of the present application provide a robot path control method. The method includes: determining a working state of a current sub-area where the robot is located in the process during which the robot moves according to a planned path; in response to detecting that the current sub-area is in the locked state, controlling the robot to stop moving; in response to detecting that the current sub-area is in the unlocked state and a next sub-area is in the locked state, determining a re-planned path for the robot to avoid the next sub-area, and guiding the robot to move according to the re-planned path; in response to detecting that the current sub-area and the next sub-area are both in the unlocked state, guiding the robot to move according to the planned path.

Embodiments of the present application further provide a server. The server includes: one or more processors and a memory configured to store one or more programs. When the one or more programs are executed by the one or more processors, the one or more processors implement the robot path control method as described above.

Embodiments of the present application further provide a computer-readable storage medium storing a computer program thereon, where the program, when executed by a processor, implements the robot path control method as described above.

In the embodiments of the present application, the working state of the current sub-area. where the robot is located is determined in the process during which the robot moves according to the planned path. If it is detected that the current sub-area is in the unlocked state and the next sub-area is in the locked state, a path is re-planned for the robot to avoid the next sub-area, and the robot is guided to move according to the re-planned path. The technical solution provided by the embodiments of the present application can adjust the path in real time according to the working states of the sub-areas in the moving process of the robot, and can control the movement path of the robot more flexibly and improve the control efficiency.

Embodiments of the present application provide a robot scheduling method. The method includes: receiving a fire signal; in response to the fire signal, when a robot is in the moving state and a next sub-area in the navigation path of the robot is located in a preset fire engine access area, controlling the robot to move to the next sub-area, continue moving according to the navigation path and stop moving until a next sub-area is not in the preset fire engine access area.

Embodiments of the present application further provide a server. The server includes one or more processors and a memory configured to store one or more programs. When the one or more programs are executed by the one or more processors, the one or more processors implement the robot scheduling method as described above.

Embodiments of the present application further provide a computer-readable storage medium storing a computer program thereon, where the program, when executed by a processor, implements the robot scheduling method as described above.

In the embodiments of the present application, a fire signal is received, and in response to the fire signal, if the robot is in the moving state and the next sub-area in the navigation path of the robot is located in the preset fire engine access area, then the robot is controlled to move to the next sub-area, continue moving according to the navigation path and stop moving until the next sub-area is not in the preset fire engine access area. The technical solutions provided by the embodiments of the present application can avoid the problems caused by delay errors or sudden braking for a robot in the moving state, and improve the efficiency of the robot leaving from the fire engine access.

DETAILED DESCRIPTION OF THE EMBODIMENTS

The present application will be described below with reference to the drawings and embodiments. It can be understood that the specific embodiments described here are only used to explain the present application, but not to limit the present application, In addition, it should be noted that, for ease of description, the drawings only show a part of the structures related to the present application instead of all the structures.

Figure 1:
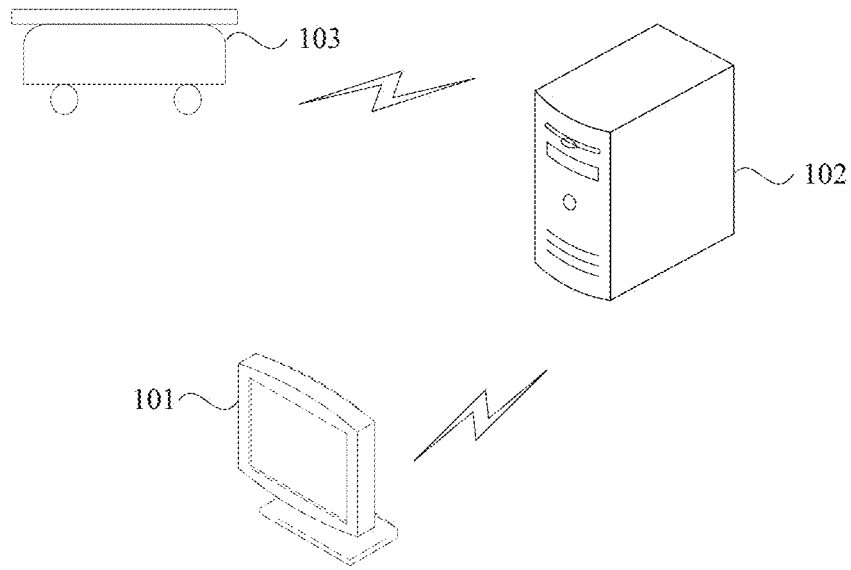
FIG. 1 is a structural schematic diagram of a robot scheduling system in an embodiment.

An embodiment of the present application provides a robot scheduling method, which is applied to a robot scheduling system. FIG. 1 is a structural schematic diagram of a robot scheduling system in an embodiment. As shown in FIG. 1, the robot scheduling system generally includes: an operating terminal 101, a server 102 and at least one robot 103. The server 102 establishes the communication links with the operating terminal 101 and the robot 103 respectively. The operating terminal 101 is configured to receive the operation information input by the staff. For example, a user can input the operation information at the operating terminal through a human-computer interaction interface to realize the scheduling control of the robot 103 in the warehouse. The server 102 is configured to generate and send a work instruction to the robot 103 according to the operation information received by the operating terminal 101 and the actual situation in the warehouse, and the robot 103 is configured to complete the work task corresponding to the work instruction according to the received work instruction.

Figure 2:
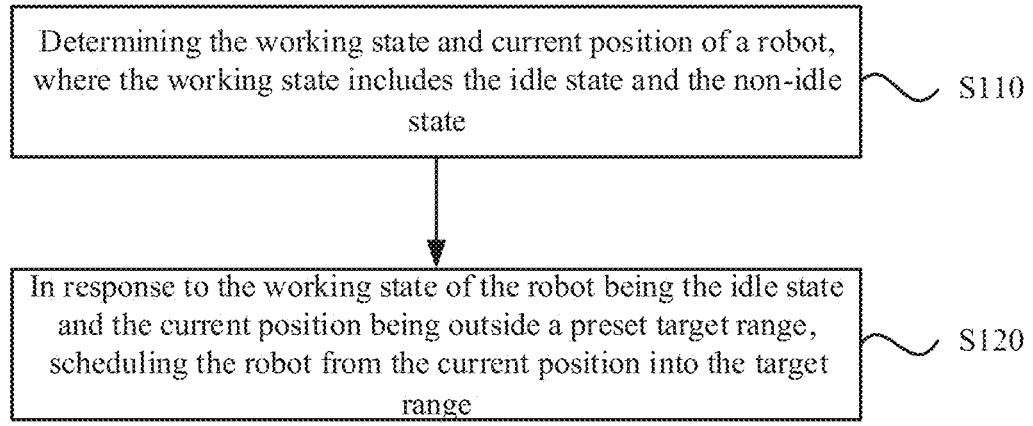
FIG. 2 is a flowchart of a robot scheduling method in an embodiment.

FIG. 2 is a flowchart of a robot scheduling method in an embodiment. This embodiment is applicable to the case of scheduling robots, and this method can be performed by a robot scheduling device. As shown in FIG. 2, the robot scheduling method can include The following operations, Operation 110: determining the working state and current position of a robot, where the working state includes: the idle state and the non-idle state.

In some embodiment, before determining the working state and current position of the robot, the method further includes: receiving a scheduling instruction, and the operation of determining the working state and current position of the robot includes: determining the working state and current position of the robot in the working area in response to the scheduling instruction.

In some embodiments, the robot refers to a target robot. The target robot refers to any robot in the warehouse but not in the target area. The target robot can be a robot with a serial number entered by a staff at the operating terminal, When the staff enters the collection command (scheduling instruction) at the operating terminal, the server traverses all the robots in the warehouse, and the robot currently inquired by the server is determined as the target robot.

In the embodiments, the determination of the working state of the robot can be achieved by the following method: determining whether the robot has a task to be performed or a task in progress; determining that the working state of the robot is the idle state in response to determining that the robot has neither task to be performed nor task in progress; and determining that the working state of the robot is the non-idle state in response to determining that the robot has the task to be performed or task in progress.

The task to be performed refers to the task corresponding to a work instruction that cannot be performed immediately after receiving the work instruction sent by the server because the robot is performing a task and that will be performed after the task currently being performed is completed; or the robot receives the work instruction sent by the server and is on the way to perform the task.

The method for determining the current position of the robot may adopt different technical solutions according to the working environment of the robot or the main work of the robot.

Embodiments of the present application provide a method for determining the current position of the robot according to a two-dimensional code. Two-dimensional codes with different coordinate values are used for covering the robot work area in advance, that is, the robot work area is evenly divided into cells with the same side length, and the cells are covered by two-dimensional codes with different coordinate values in sequence. The coordinate value corresponding to each two-dimensional code corresponds to the position of the two-dimensional code on the ground. The robot obtains the two-dimensional code corresponding to the position where it is currently located, and then the current position of the robot is determined according to the coordinate value corresponding to the obtained two-dimensional code.

Operation 120: in response to that the working state of the robot is idle and the current position is outside a preset target range, scheduling the robot from the current position into the target range.

In some embodiments, the shape of the target range is a rectangle, and the target range is determined by a preset starting position, a preset width and a preset height.

The preset target range refers to an idle area on the warehouse floor, and the idle area can be set at any time according to the position of the robot in the warehouse. That is, when the staff enters the collection command at the operating terminal, the server searches for an idle area in the warehouse. In one embodiment, the idle area is preferentially an area closer to the work station of the staff Exemplarily, the selection of the preset target range is realized by the following command.

<!—robot collection area—>
logoutzone x="9", y="6", w="14", h="2"/> where x and y represent the coordinate values of the starting point of the target range, x ="9" and y="6" mean that the starting point of the target range is the cell with the abscissa of 9 and the ordinate of 6. Parameters w and h represent the length and height respectively of the target range, w="14" indicates that the length of the target range is 14 cells, and h="2" indicates that the height of the target range is 2 cells.

When the current position of the robot is outside the preset target range, the working state of the robot is determined, and when the working state of the robot is the idle state, the robot is scheduled from the current position into the target range.

When the current position of the robot is outside the preset target range, the working state of the robot is determined, and when the working state of the robot is the non-idle state, the non-idle robot is skipped and it is continued to inquire the work state and current position of the next robot, where nothing is done for the robot in the non-idle state.

When the current position of the robot is within the preset target range, the robot in the preset target range is skipped, and it is continued to inquire the working state and current position of the next robot, where nothing is done for the robot in the preset target range.

When the number of robots is greater than the number of robots that can be accommodated in the target range, a new target range is re-determined, and when the working state of the robot is idle and the current position is outside the preset target range, the robot is scheduled from the current position into the new target range.

The embodiments of the present application provide a robot scheduling method. In the method, the working state of the robot and the current position of the robot are determined at first, the working state including the idle state and the non-idle state. When the working state of the robot is idle and the current position is outside the preset target range, the robot can be scheduled from the current position into the target range. That is, in the technical solution proposed by the embodiments of the present application, when the working state of the robot is idle and the current position is outside the preset target range, the robot target can be scheduled into the designated area for collection, and the robot can be automatically scheduled to the designated area, thereby reducing the operation and maintenance cost and improving the work efficiency.

Figure 3:
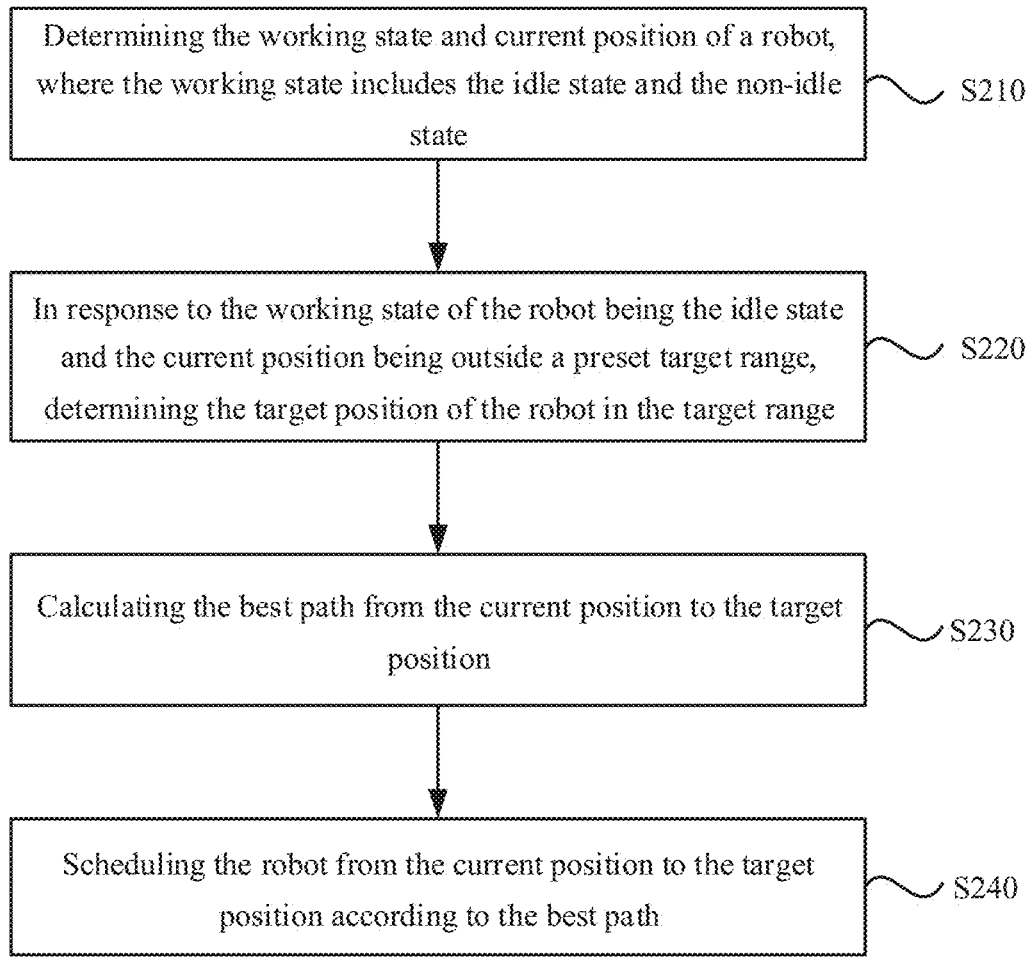
FIG. 3 is a flowchart of another robot scheduling method in an embodiment.

FIG. 3 is a flowchart of another robot scheduling method in some embodiments. On the basis of the above embodiments, this embodiment describes the operation of "scheduling the robot from the current position into the target range". As shown in FIG. 3, the robot scheduling method may include the following operations.

Operation S210: determining the working state and current position of a robot, where the working state includes: the idle state and the non-idle state.

Operation S220: when the working state of the robot is idle and the current position is outside a preset target range, determining the target position of the robot in the target range.

In this embodiment, the target range is divided into at least one cell, and the target position of the robot is determined in units of cells. The target range is determined by the starting position of the target range and the scheduling condition. When the current position of the robot is outside the preset target range, the working state of the robot is determined, and when the working state of the robot is the idle state, the target position of the target robot is determined in the target range.

Figure 4:
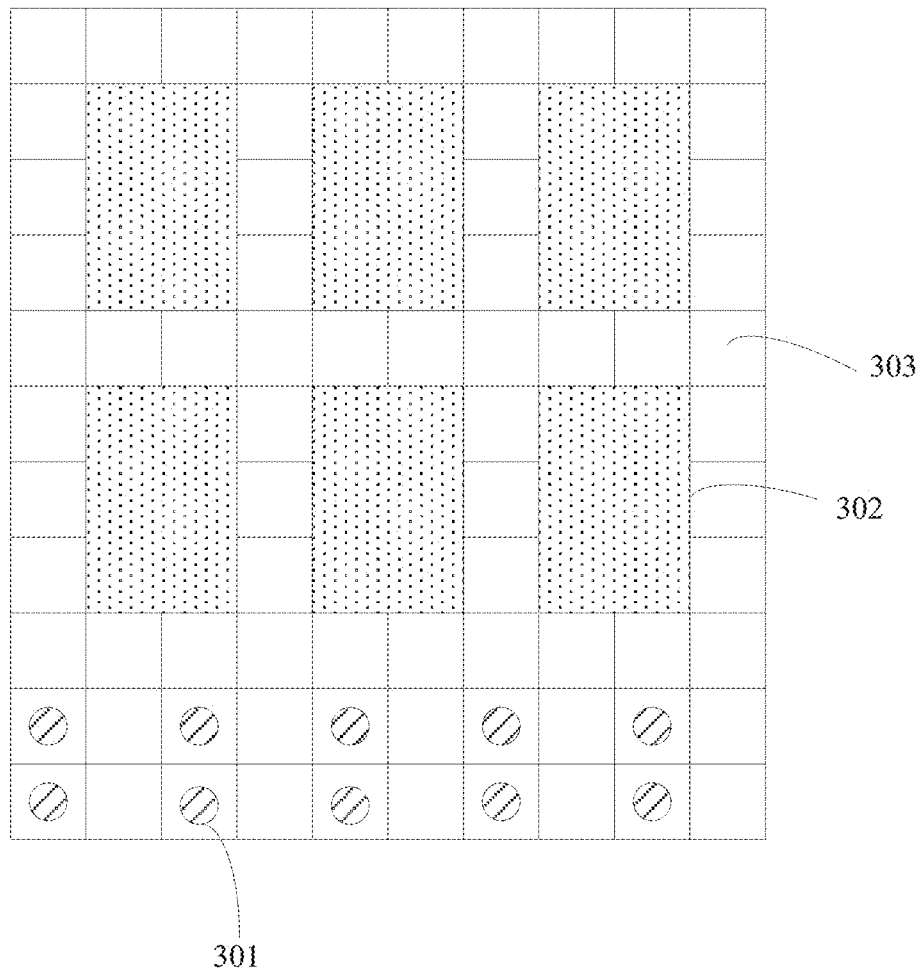
FIG. 4 is a schematic diagram illustrating the distribution of robots within the target range in an embodiment.

In this embodiment, the target position refers to the position where the robot stays within the target range. This embodiment provides a method for distributing positions of robots when they gather within a target range. FIG. 4 is a schematic diagram of the distribution of robots within the target range in an embodiment. As shown in FIG. 4, the circles 301 represent the positions where robots stay when gathering in the target range, the dotted rectangles 302 represent the positions of shelves in the warehouse, and the blank cells 303 represent the empty channels in the warehouse yard for robots to run.

This embodiment only shows one case, and does not limit the positions of items in the warehouse. Passages must be formed between the blank cells 303 to facilitate the provision of a running channel for the robots. The circles 301 may be arranged horizontally or vertically, and the shape of the target area is not limited as long as the robots in the idle state are collected in an idle area.

The operation of determining the target position of the robot within the target range includes: determining a planned position of the robot within the target range; determining whether the planned position of the robot satisfies a preset scheduling condition, and determining the planned position of the robot as the target position of the robot in response to determining that the planned position of the robot satisfies the scheduling condition.

The planned position of the robot refers to a position selected by the server arbitrarily within the target range, or may be a position selected as required based on the starting point of the target range. The preset scheduling condition is not affecting the operations of other robots when the robot stays at the planned position. When a robot is required to run, there is no need to adjust positions of other robots, and this robot can come out quickly. In some embodiments, the preset scheduling condition includes: when the robot is arranged vertically, the cells adjacent horizontally to the planned position of the robot are idle; when the robot is arranged horizontally, the cells adjacent vertically to the planned position of the robot are idle. In the case when the planned position of the robot meets the scheduling condition, the planned position of the robot is determined as the target position of the robot. The target positions of the robots meeting the scheduling condition are all separated by one position, that is, the target positions of the robots meeting the scheduling condition are separated by one cell.

Exemplarily, as shown in FIG. 4, the coordinates of the cells in FIG. 4 from left to right are marked as (1,1), (1,2), (1,3), (1,4), (1,5), (1,6), (1,7), (1,8), (1,9), (1,10), and the coordinates of the cells in FIG. 4 from bottom to top are marked as (1,1), (2.1), (3,1), (4,1), (5,1), (6,1), (7,1), (8,1), (9,1), (10,1), (11,1). Taking the cell with the coordinate values (1,1) as the starting point of the target range and taking the cell with the coordinate values (1,1) as the planned position, determining whether the cell with the coordinate values (1,1) is the target position of robots other than the current robot. When the cell with the coordinate values (1,1) is not the target position of robots other than the current robot, determining whether the cell with the coordinate values (1,1) is the path cell that other robots need to pass when running. When the cell with the coordinate values (1,1) is not the path cell that other robots need to pass when running, the cell with the coordinate values (1,1) is taken as the target position of the current robot. When the cell with the coordinate values (1,1) is the path cell that other robots need to pass when running, it means that the current planned position is unreasonable, and another position in the site is reselected as the planned position.

In some embodiments, when the cell with the coordinate values (1,1) is taken as the target position of the robot, the planned position corresponding to the next robot can be selected as the position apart by one cell from the cell with the coordinate values (1,1), that is, the cell with the coordinate values (1,3) or (3,1) is taken as the planned position.

All the robots in the warehouse are traversed until no robots in the idle state are outside the target range, that is, all the robots in the idle state are collected within the target range. Or there is no target position that meets the scheduling condition within the target range.

Operation S230: calculating the best path from the current position to the target position.

In this embodiment, it is necessary to establish an initialized path diagram in advance, where the initialized path is designed for the condition of no goods. The initialized path diagram consists of many horizontal and vertical line segments, which form the sequence of robot walking. The robot can walk arbitrarily back and forth along the left-right or up-down direction on the ground with no obstacle.

After determining the current position and target position of the robot, all possible paths from the current position to the target position are calculated, and the shortest path between the current position and the target position is determined as the planned path of the robot. It is determined whether the running paths of other robots except the current robot have cells that overlap with the planned path of the current robot. When the running paths of other robots except the current robot have no cell that overlaps with the planned path of the current robot, the shortest path between the current position and the target position is taken as the best path of the current robot.

When the running paths of other robots except the current robot have cells that overlap with the planned path of the current robot, the time durations for the current robot to reach the overlapped cells and the time durations for other robots to reach the overlapped cells are calculated. When the time duration for the current robot to reach each overlapped cell is different from the time duration for other robots to reach the corresponding overlapping cell, the shortest path between the current position and the target position is taken as the best path of the current robot.

When the time duration for the current robot to reach any overlapping cell is the same as the time duration for another robot to reach the corresponding overlapping cell, other path between the current position and the target position is reselected as the planned path of the current robot. And whether the planned path can be taken as the best path is recalculated according to the above operations.

Operation S240: scheduling the robot from the current position to the target position according to the best path.

After calculating the best path from the current position to the target position, the solution of the best path is sent to the robot, so that the robot drives from the current position to the target position according to the best path to complete the collection of robots.

The embodiment of the present application proposes a robot scheduling method, in which the working state of the robot and the current position of the robot are determined at first, the working state including the idle state and the non-idle state. When the current position of the robot is outside the preset target range and the working state is idle, the target position of the robot is determined within the target range; the best path from the current position to the target position is calculated; and the robot is scheduled from the current position to the target position according to the best path. That is, in the technical solution proposed by the embodiment of the present application, when the current position of the robot is outside the preset target range and the working state is idle, the robot can be scheduled into the designated area for collection, and the robot can be automatically scheduled to the designated area, thereby reducing the operation and maintenance cost and improving the work efficiency.

Figure 5:
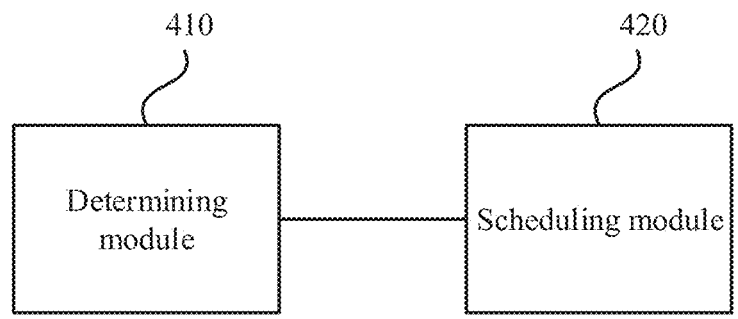
FIG. 5 is a structural schematic diagram of a robot scheduling device in an embodiment.

FIG. 5 is a structural schematic diagram of a robot scheduling device in an embodiment. This embodiment is applicable to the case of scheduling robots. As shown in FIG. 5, the robot scheduling device may include the following parts: a determining module 410 and a scheduling module 420.

The determining module 410 is configured to determine the working state and current position of a robot; where the working state includes: the idle state and the non-idle state.

In some embodiments, the above-mentioned device further includes a receiving module configured to receive a scheduling instruction. The determining module 410 is configured to determine the working state and current position of the robot in the working area in response to the scheduling instruction.

The scheduling module 420 is configured to: when the working state of the robot is idle and the current position is outside a preset target range, schedule the robot from the current position into the target range.

In some embodiments, the determining module 410 includes: a judgment sub-module (not shown in FIG. 5) and a determining sub-module (not shown in FIG. 5). The judgment sub-module is configured to determine whether the robot has a task to be performed or a task in progress. The determining sub-module 4102 is configured to determine that the working state of the robot is the idle state in response to determining that the robot has neither task to be performed nor task in progress; and determine that the working state of the robot is the non-idle state in response to determining that the robot has task to be performed or task in progress.

In some embodiments, the scheduling module 420 includes: a calculation sub-module (not shown in FIG. 5) and a scheduling sub-module (not shown in FIG. 5). The calculation sub-module 4201 is configured to determine the target position of the robot in the target range when the working state of the robot is idle and the current position is outside the preset target range; and calculate the best path from the current position to the target position. The scheduling sub-module 4202 is configured to schedule the robot from the current position to the target position according to the best path.

In some embodiments, the calculation sub-module is configured to determine the target position of the robot within the target range by way of: determining a planned position of the robot within the target range; determining whether the planned position of the robot satisfies a preset scheduling condition, and determining the planned position of the robot as the target position of the robot when the planned position of the robot satisfies the scheduling condition.

In some embodiments, the target range is divided into at least one cell, and the target position of the robot is determined in units of cells; where the target range is determined by the starting position of the target range and the scheduling condition.

In some embodiments, the shape of the target range is a rectangle, and the target range is determined by a preset starting position, a preset width and a preset height.

In some embodiments, the preset scheduling condition includes: when the robot is arranged vertically, the cells adjacent horizontally to the planned position of the robot are idle; when the robot is arranged horizontally, the cells adjacent vertically to the planned position of the robot are idle.

In some embodiments, the device is further configured to: when the number of robots is greater than the number of robots that can be accommodated in the target range, re-determine a new target range, and when the working state of the robot is idle and the current position is outside the preset target range, schedule the robot from the current position into the new target range.

Embodiments of the present application provides a robot scheduling device. The robot scheduling device is configured to perform the following operations: the working state of the robot and the current position of the robot are determined at first; where the working state includes: the idle state and the non-idle state; and when the working state of the robot is idle and the current position is outside the preset target range, the robot can be scheduled from the current position into the target range. That is, in the technical solution proposed by the embodiments of the present application. When the working state of the robot is idle and the current position is outside the preset target range, the robot can be scheduled into the designated area for collection, and the robot can be automatically scheduled to the designated area, thereby reducing the operation and maintenance cost and improving the work efficiency.

The robot scheduling device provided in the embodiment of the present application can perform the robot scheduling method provided in any embodiment of the present application, and has the corresponding functional modules performing the method and beneficial effects.

Figure 6:
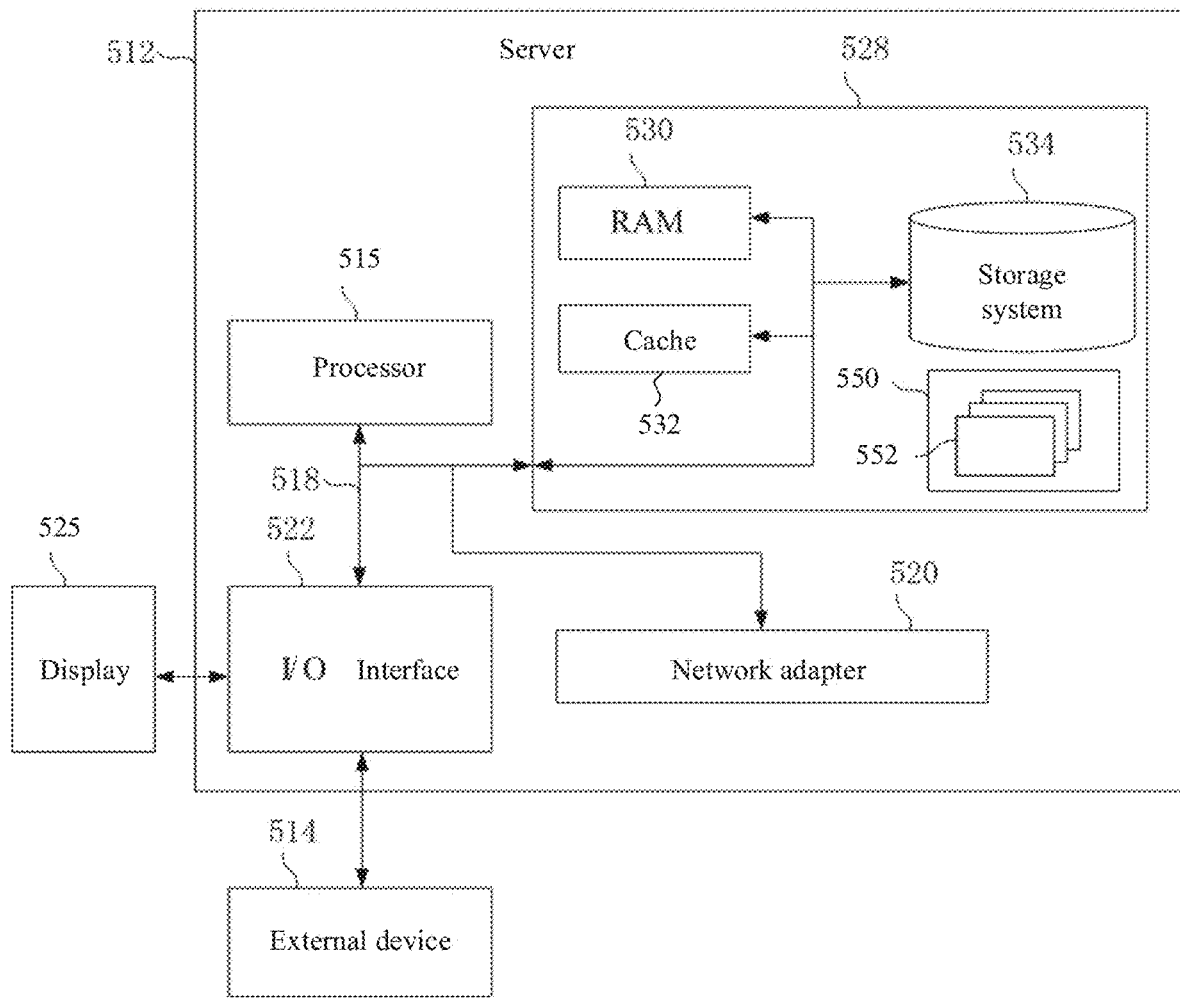
FIG. 6 is a structural schematic diagram of a server provided by an embodiment.

FIG. 6 is a structural schematic diagram of a server provided by an embodiment. FIG. 6 shows a block diagram of an exemplary server 512 suitable for implementing the embodiments of the present application. The server 512 shown in FIG. 6 is only one example, and should not bring any limitation to the functions and usage scope of the embodiments of the present application.

As shown in FIG. 6, the server 512 is represented in the form of a general-purpose device. The components of the server 512 may include but not limited to: one or more processors or a processor 515, a system memory 528, and a bus 518 connecting different system components (including the system memory 528 and the processor 515).

The bus 518 represents one or more of several types of bus structures, including a memory bus or a memory controller, a peripheral bus, a graphics acceleration port, a processor, or a local bus using any of multiple bus structures. For example, these architectures include but not limited to:

Industry Standard Architecture (ISA) bus, MicroChannel Architecture (MCA) bus, enhanced ISA bus, Video Electronics Standards Association (VESA) local bus, and Peripheral Component Interconnect (PCI) bus.

In some embodiments, the server 512 includes a variety of computer system readable media. These media can be any available media that can be accessed by the server 512, including volatile and non-volatile media, removable and non-removable media.

The system memory 528 may include a computer system readable medium in the form of volatile memory, such as a Random Access Memory (RAM) 530 and/or a cache memory 532. The server 512 may include oilier removable/non-removable, volatile/nonvolatile computer system storage media. Merely as an example, the storage system 534 may be used to read from and write to the non-removable and non-volatile magnetic media (not shown in FIG. 6, and commonly referred to as "hard drives"). Although not shown in FIG. 6, a magnetic disk drive for reading from and writing to a removable and non-volatile magnetic disk (such as "floppy disk") and an optical disk drive for reading from and writing to a removable and non-volatile optical disk (such as Compact Disc Read-Only Memory (CD-ROM), Digital Video Disc-Read Only Memory (DVD-ROM) or other optical media) may be provided. In these cases, each drive may be connected to the bus 518 through one or more data medium interfaces. The system memory 528 may include at least one program product that has a set of (for example, at least one) program modules configured to perform the functions of any embodiment of the present application.

A program/utility tool 550 having a set of (at least one) program modules 552 can be stored in, for example, the system memory 528. Such program module 552 includes but not limited to: operating system, one or more application programs, other program modules and program data. Each or a combination of these examples may include the realization of a network environment. The program module 552 generally executes the functions and/or methods in the described embodiments of the present invention.

The server 512 may also communicate with one or more external devices 514 (such as keyboard, pointing device, display 525, etc.), and may also communicate with one or more devices that enable users to interact with the server 512, and/or communicate with any device (e.g., network card, modem, etc.) that enables the server 512 to communicate with one or more other computing devices. Such communication may be performed through an input/output (I/O) interface 522. In addition, the server 512 may also communicate with one or more networks (for example, Local Area Network (LAN), Wide Area Network (WAN) and/or public network such as Internet) through a network adapter 520 As shown in FIG. 6, the network adapter 520 communicates with other modules of the server 512 through the bus 518. It should be understood that, although not shown in FIG. 6, other hardware and/or software modules can be used in conjunction with the server 512, including but not limited to: microcode, device driver, redundant processing unit, external disk drive array, Redundant Arrays of Independent Drives (RAID) system, tape drive, and data backup storage system, etc.

The processor 515 executes a variety of functional applications and data processing by running the programs stored in the system memory 528, for example, to implement the robot scheduling method provided in the embodiments of the present application: determining the working state and the current position of the robot; wherein the working state includes: the idle state and the non-idle state; and when the working state of the robot is idle and the current position is outside the preset target range, scheduling the robot from the current position into the target range.

Embodiments of the present application provide a server. This server determines the working state and the current position of the robot at first; wherein the working state includes: the idle state and the non-idle state; and can schedule the robot from the current position into the target range when the working state of the target robot is idle and the current position is outside the preset target range. That is, in the technical solution proposed by the embodiments of the present application, when the working state of the robot is idle and the current position is outside the preset target range, the robot can be scheduled into the designated area for collection, and the robot can be automatically scheduled to the designated area, thereby reducing the operation and maintenance cost and improving the work efficiency.

Embodiments of the present application further provide a computer-readable storage medium on which a computer program is stored, where the program, when executed by a processor, implements the robot scheduling method as provided in all the embodiments of the present application: determining the working state and the current position of the robot; wherein the working state includes: the idle state and the non-idle state; and when the working state of the robot is idle and the current position is outside the preset target range, scheduling the robot from the current position into the target range.

The computer storage media of the embodiment of the present application may adopt any combination of one or more computer-readable media. The computer-readable medium may be a computer-readable signal medium or a computer-readable storage medium. The computer-readable storage medium may be, for example but not limited to, electrical, magnetic, optical, electromagnetic, infrared, or semiconductor system, apparatus or device, or any combination thereof. Examples of the computer-readable storage media (non-exhaustive list) include: electrical connection with one or more wires, portable computer disk, hard disk, RAM, Read-Only Memory (ROM), Erasable Programmable Read Only Memory (EPROM) or flash memory, optical fiber, portable CD-ROM, optical storage device, magnetic storage device, or any suitable combination thereof. In this document, the computer-readable storage medium can be any tangible medium that contains or stores a program, where the program can be used by or used in combination with the instruction execution system, apparatus or device.

The computer-readable signal medium may include data signals propagated in the baseband or as a part of carrier waves, and the computer-readable signal medium bears the computer-readable program codes. Such propagated data signals can be in many forms, including but not limited to electromagnetic signals, optical signals, or any suitable combination thereof. The computer-readable signal medium may also be any computer-readable medium other than the computer-readable storage medium, and the computer-readable medium may send, propagate or transmit the programs used by or used in combination with the instruction execution system, apparatus or device.

The program codes contained on the computer-readable medium can be transmitted by any suitable medium, including but not limited to wireless, wire, optical cable, Radio Frequency (RF), etc., or any suitable combination thereof.

The computer program codes for performing the operations of the present application can be compiled in one or more programming languages or a combination of multiple programming languages, where the programming languages include the object-oriented programming languages such as Java, Smalltalk, C++, and also include the conventional procedural programming languages such as "C" language or similar programming languages. The program codes can be executed entirely on a user computer, executed partly on a user computer, executed as an independent software package, executed partly on a user computer and partly on a remote computer, or executed entirely on a remote computer or server. In the case of a remote computer, the remote computer can be connected to the user computer through any kind of network including LAN or WAN, or can be connected to an external computer (for example, using the Internet service provider to connect via the Internet).

Figure 7:
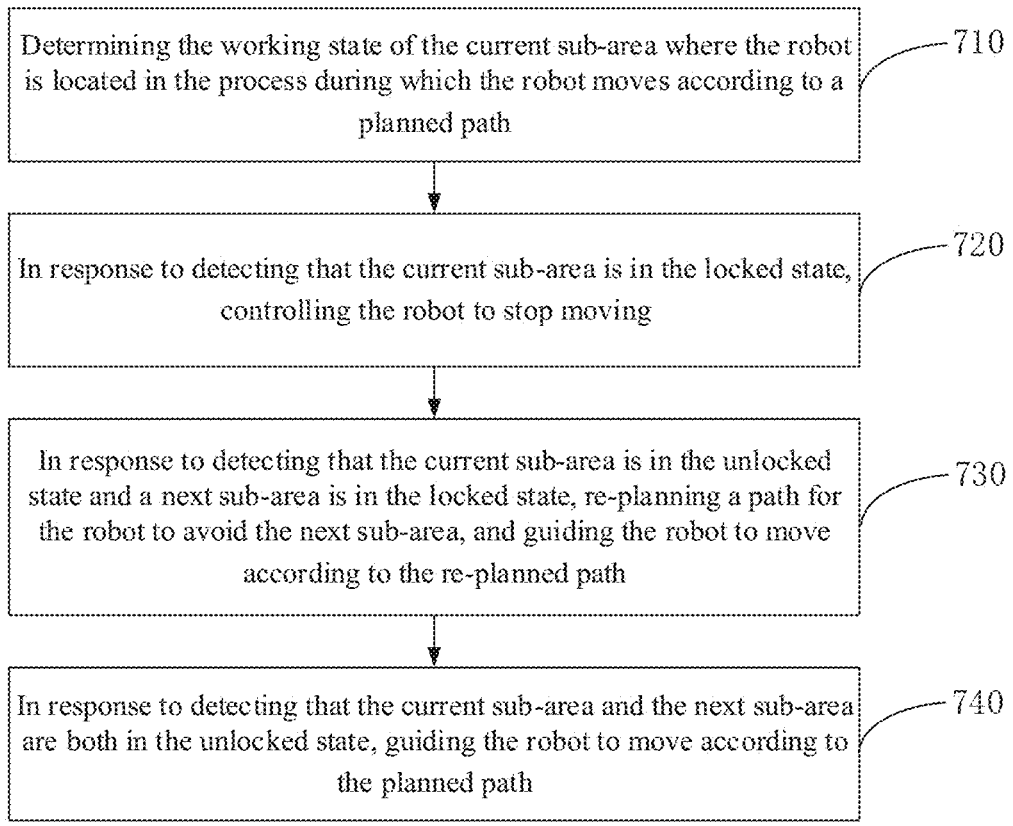
FIG. 7 is a flowchart of a robot path control method in an embodiment.

FIG. 7 is a flowchart of a robot path control method in some embodiments. The embodiments are applicable to the case of robot control, and the method may be performed by a robot path control device which may be implemented by software and/or hardware, for example, the device can be configured in a server. This method is applicable to the path control in any navigation mode, such as QR code navigation or Simultaneous Localization And Mapping (SLAM) navigation. The method may include the following operations.

Operation 710: determining the working state of the current sub-area where the robot is located in the process during which the robot moves according to a planned path.

In some embodiments, the sub-area may be a cell.

In this embodiment, the working area of the robot on the map is divided into a plurality of sub-areas as needed in advance, where the working state of each sub-area may include: unlocked state and locked state, and these two working states can be switched as required. In this embodiment, the sub-area in the unlocked state indicates that the sub-area is in the normal state and allows the robot to move through; and the sub-area in the locked state indicates that the sub-area refuses all robots to enter and move, including the robot for which the path has been planned (i.e., the path includes this sub-area) and the robots for which paths have not been planned.

In some embodiments, the states of cells in the working area are determined so that the cells of which the working states are locked are not on the planned path in the process of planning the path for the robot.

The robot scheduling system can plan the path according to the destination in advance. In the process of planning the path for the robot, the sub-areas of which the current working states are locked and the sub-areas marked as obstacles will be obtained, and an obstacle matrix table can be determined according to the indexes of the above sub-areas in the map. If the currently traversed sub-area is marked in the obstacle matrix table, the sub-area is skipped. In some embodiments, the sub-areas marked as obstacles may be sub-areas that are fixed in the work area and do not allow robots to move, such as sub-areas where building pillars are located, etc.

In some embodiments, the method further includes: in response to a working state setting instruction, setting the working state of at least one sub-area specified by the working state setting instruction as the state specified by the working state setting instruction, In some embodiments, in response to the operation of pressing a work state setting option of any sub-area, the working state of the sub-area is set as a specified state, or in response to the operation of inputting coordinates of any sub-area, the working state of the sub-area is set as a specified state.

The robot scheduling system can obtain the coordinates of any sub-area input by the standard interface from the outside, and set the working state of the sub-area as the specified state. Exemplarily, the interface format may be: {cellPoints: [{x:15.5, y:16.5}, {x: 16.5, y:16.5}] instruction: LOCK_SHELF}, which represents the coordinates of two to-be-locked sub-areas of which the abscissa is 15.5, the ordinate is 16.5 and the abscissa is 16.5, the ordinate is 16.5.

The robot scheduling system can also preset the work state setting option corresponding to each sub-area, and set the work state of the sub-area to a specified state, where one sub-area may correspond to one work state setting option, or multiple sub-areas may correspond to one work state setting option. In some embodiments, the setting may be performed through the root tag "mapareas" of the map, where the root tag defines a plurality of areas, each area has a unique ID, the starting point of the area is composed of attributes x and y, and w and h represent the size of the rectangle. Areas are allowed to have overlapping parts, for example: <mapareas><area areaid="1" x="9" y="2" w="9" h="10"/><area areaid="2" x="17" y="2" w="7" h="10"/></mapareas>. The work state setting option can be set by hardware or software. When the work state setting option is pressed, the sub-area corresponding to the work state setting option will be set to the specified state.

In some embodiments, the method may further include: in response to detecting that there is a moving obstacle in the path, setting the sub-area with the moving obstacle to the locked state. Here, the moving obstacles may include obstacles that affect the movement of the robot, such as robot failures, robot accidents, and goods falling. Different moving obstacles correspond to different sub-areas that need to be in the locked state. For example, if the moving obstacle is robot failure, the sub-area where the robot is located and 8 adjacent sub-areas can be set to the locked state. If the moving obstacle is goods falling, the sub-area where the goods fall and 24 adjacent sub-areas can be set to the locked state.

Operation 720: in response to detecting that le current sub-area is in the locked state, controlling the robot to stop moving.

In the process during which the robot moves according to the planned path, if it is detected that the current sub-area is in the locked state, the path scheduling module stops allocating sub-areas for the robot and controls the robot to stop moving.

Operation 730: in response to detecting that the current sub-area is in the unlocked state and a next sub-area is in the locked state, re-planning a path for the robot to avoid the next sub-area, and guiding the robot to move according to the re-planned path.

If it is detected that the current sub-area is in the unlocked state and the next sub-area is in the locked state, that is, the path scheduling module detects that the next sub-area is in the locked state when allocating sub-areas to the robot according to the path, then it will not allocate the sub-area to the robot, and the robot scheduling system can re-plan a path for the robot, control the robot to move according to the re-planned path to avoid the sub-areas in the locked state, and guide the robot to move according to the re-planned path.

In some embodiments, the operation of re-planning the path for the robot to avoid the next sub-area may include: the robot scheduling system may recalculate the losses of multiple paths by using the sub-area where the robot is currently located as the starting point and the original end point as the end point, avoid the sub-areas in the locked state, take the path with the least loss as the re-planned path, and control the robot to move according to the re-planned path.

Operation 740: in response to detecting that the current sub-area and the next sub-area are both in the unlocked state, guiding the robot to move according to the path.

If it is detected that the current sub-area and the next sub-area are both in the unlocked state, the path scheduling module allocates sub-areas to the robot according to the planned path, and guides the robot to move according to the path.

In some embodiments, a full-field lock button can also be provided, and the full-field lock button can be set in software or hardware. In response to the full-field lock operation, all robots in the work area are controlled to stop moving, and the path scheduling module stops allocating sub-areas for all the robots.

In the technical solution of this embodiment, the working state of the current sub-area where the robot is located is determined in the process during which the robot moves according to the planned path. If it is detected that the current sub-area is in the unlocked state and the next sub-area is in the locked state, a path is re-planned for the robot to avoid the next sub-area, and the robot is guided to move according to the re-planned path. Since the working states of the sub-areas in the path can be dynamically modified in real time, the technical solution provided by this embodiment can adjust the path in real time according to the working states of the sub-areas in the moving process of the robot, and can control the movement path of the robot more flexibly and improve the control efficiency.

In some embodiments, on the basis of the above technical solution, the method further includes: in response to detecting that the current sub-area is in the buffer state and the next sub-area is in the locked state, re-planning a path for the robot to avoid the next sub-area, and guiding the robot to move according to the re-planned path; in response to detecting that the current sub-area and the next sub-area are both in the buffer state, that the current sub-area is in the unlocked state and the next sub-area is in the buffer state, or that the current sub-area is in the buffer state and the next sub-area is in the unlocked state, guiding the robot to move according to the path.

In some embodiments, the operation of re-planning a path for the robot to avoid the next sub-area and guiding the robot to move according to the re-planned path in response to detecting that the current sub-area is in the buffer state and the next sub-area is in the locked state, includes: in response to detecting that the current sub-area of the robot in the path is in the unlocked state and the next sub-area is in the locked state, determining whether the next sub-area is still in the locked state after a preset time duration; and in response to determining that the next sub-area is still in the locked state after the preset time duration, re-planning a path for the robot to avoid the next sub-area, and guiding the robot to move according to the re-planned path.

Figure 8:
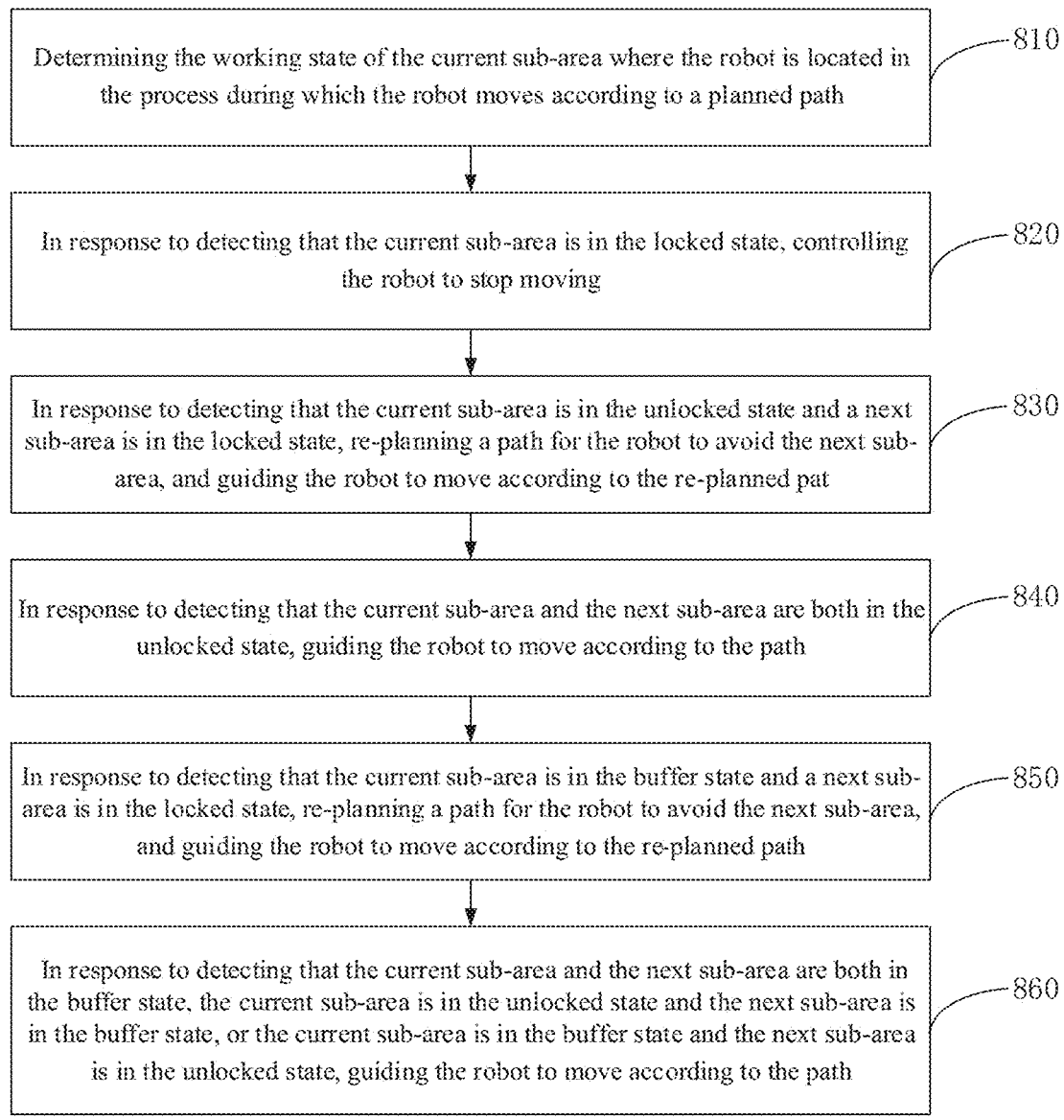
FIG. 8 is a flowchart of another robot path control method in an embodiment.

FIG. 8 is a flowchart of another robot path control method in an embodiment. This embodiment describes the robot path control method on the basis of the foregoing embodiments. The method of this embodiment may include the following operations.

Operation 810: determining the working state of the current sub-area where the robot is located in the process during which the robot moves according to a planned path.

Figure 9:
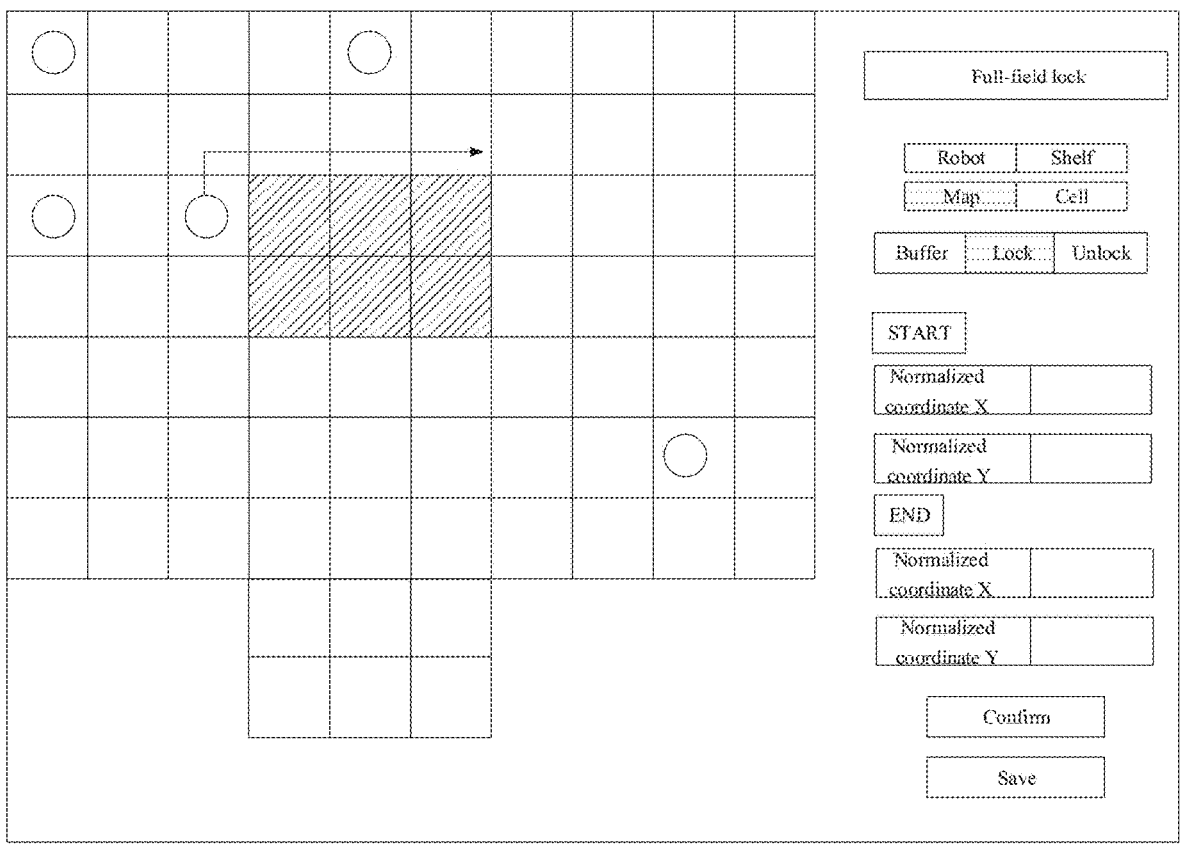
FIG. 9 is a schematic diagram of a sub-area in the locked state in the map operation interface in an embodiment.

In the process during which the robot moves according to the planned path, the coordinates of any sub-area set artificially can be obtained through the map operation interface of the robot scheduling system, and the working state of the sub-area is set to a specified state. As shown in FIG. 9, FIG. 9 is a schematic diagram of sub-areas in the locked state in the map operation interface in an embodiment. The sub-areas can be selected and saved in the map operation interface, that is, the coordinates of the sub-areas to be locked are obtained. In FIG. 9, "Lock" is selected in the right menu, and the working area on the left is selected and saved. After saving, the selected sub-areas will change color or be added with marks for distinguishing from others. The sub-areas marked with diagonal lines in FIG. 9 are the selected sub-areas in the locked state, and the circles in FIG. 9 represent robots. If "Lock" or "Unlock" is selected in the right menu in FIG. 9, when a selection is made in the working area on the left, the selected sub-areas are the sub-areas to be locked or the subareas to be unlocked.

In the map operation interface, the state attributes of sub-areas can include unlocked, locked and buffered. After the sub-area to be locked is selected and saved in the map operation interface, the coordinates of the sub-area to be locked are obtained, and the state attribute of the locked sub-area can be set as locked according to the coordinates. As shown in FIG. 9, "Lock" is selected on the right menu in FIG. 9, and then the state attribute of the selected sub-area is set as locked. It is also possible to select and save the sub-area to be buffered and the sub-area to be unlocked in the map operation interface, and set the state attributes of the sub-area to be buffered and the sub-area to be unlocked as buffered and unlocked respectively.

In addition, as shown in FIG. 9, in the map operation interface of the robot scheduling system, the start and end points of the path can be set by directly inputting the normalized coordinates (X, Y) in the start point menu and the end point menu on the right. The robot scheduling system can also include a robot operation interface, a shelf operation interface, and a cell (sub-area) operation interface, etc., which are used to control robots, shelves and cells (sub-areas), etc.

The robot scheduling system can also obtain the coordinates of any sub-area input from the outside through a standard interface, and set the working state of the sub-area as a specified state.

In some embodiments, the method further includes: in response to a working state setting instruction, setting the working state of at least one sub-area specified by the working state setting instruction as the state specified by the working state setting instruction. In some embodiments, in response to the operation of pressing a working state setting option of any sub-area, the working state of the sub-area is set as a specified state, or in response to the operation of inputting coordinates of any sub-area, the working state of the sub-area is set as a specified state. When detecting that there is a moving obstacle in the path, the sub-area with the moving obstacle is set to the locked state.

Operation 820: in response to detecting that the current sub-area is in the locked state, controlling the robot to stop moving.

Operation 830: in response to detecting that the current sub-area is in the unlocked state and a next sub-area is in the locked state, re-planning a path for the robot to avoid the next sub-area, and guiding the robot to move according to the re-planned path.

In some embodiments, when detecting that the current sub-area of the robot in the path is in the unlocked state and the next sub-area is in the locked state, determining whether the next sub-area is still in the locked state after a preset time duration; and when the next sub-area is still in the locked state after the preset time duration, a path is re-planned for the robot to avoid the next sub-area, and the robot is guided to move according to the re-planned path. As shown in FIG.

9, the arrowed route represents the path re-planned for the robot. The robot moves according to the re-planned path to avoid the sub-areas marked by the diagonal lines (the sub-areas in the locked state).

In this embodiment, the preset time duration can be set as required, for example, the preset time duration can be set to 20 s.

Operation 840: in response to detecting that the current sub-area and the next sub-area are both in the unlocked state, guiding the robot to move according to the path.

Operation 850: in response to detecting that the current sub-area is in the buffer state and a next sub-area is in the locked state, re-planning a path for the robot to avoid the next sub-area, and guiding the robot to move according to the re-planned path.

In some embodiments, the working states may further include the buffer state, and the sub-area in the buffer state means that this sub-area has no influence on the robot for which a path (which includes this sub-area) has been planned and allows it to move in this sub-area, but this sub-area does not allow robots without path planning to move, that is, this sub-area need be avoided when making the path planning.

In the process during which the robot moves according to the planned path, the sub-area in the buffer state in the path is equivalent to being in the unlocked state, that is, if it is detected that the current sub-area of the robot in the path is in the buffer state and the next sub-area is in the locked state, a path is re-planed for the robot to avoid the next sub-area, and the robot is guided to move according to the re-planned path.

Operation 860: in response to detecting that the current sub-area and the next sub-area are both in the buffer state, that the current sub-area is in the unlocked state and the next sub-area. is in the buffer state, or that the current sub-area is in the buffer state and the next sub-area is in the unlocked state, guiding the robot to move according to the path.

In some embodiments, a full-field lock button can also be provided, and the full-field lock button can be set in software or hardware. In response to the full-field lock operation, all robots in the work area are controlled to stop moving, and the path scheduling module stops allocating sub-areas for all the robots. Referring to FIG. 9, a full-field lock button can be set in the map operation interface. In the case of detecting that the full-field lock button is pressed, all robots in the work area are controlled to stop moving.

In the technical solution of this embodiment, in the process during which the robot moves according to the planned path, if it is detected on the map operation interface that the current sub-area in the path is in the unlocked state or buffer state and that the next sub-area is in the locked state and still in the locked state after the preset time duration, a path is re-planned for the robot to avoid the next sub-area, and the robot is guided to move according to the re-planned path. The technical solution provided in this embodiment can adjust the path in real time according to the states of the sub-areas during the movement of the robot, can control the movement path of the robot more flexibly and improve the control efficiency; and set the buffer state to restrict the robots without path planning, release the robots with planned paths, and realize the control of the robots in many ways.

Figure 10:
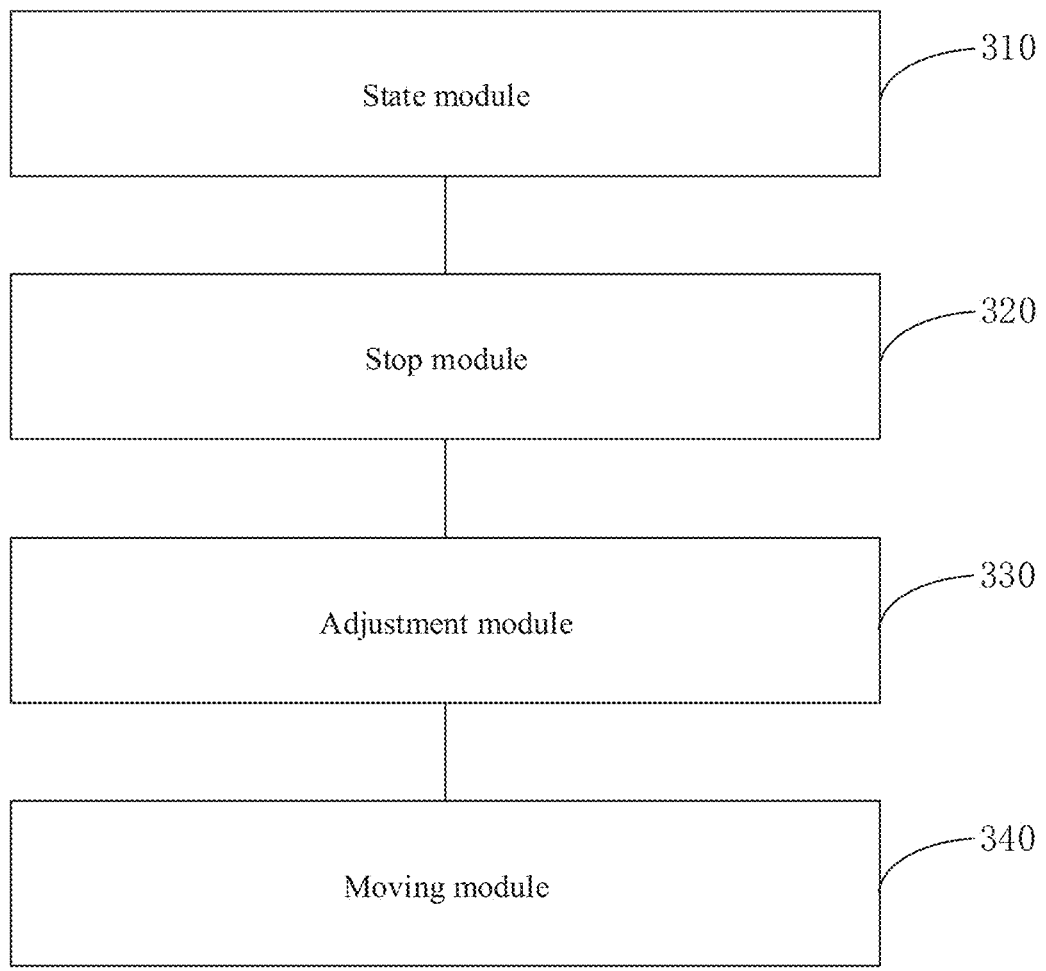
FIG. 10 is a structural schematic diagram of a robot path control device in an embodiment.

FIG. 10 is a structural schematic diagram of a robot path control device in an embodiment. The device may include: a state module 310 configured to determine the working state of the current sub-area where the robot is located in the process during which the robot moves according to a planned path; a stop module 320 configured to control the robot to stop moving in response to detecting that the current sub-area is in the locked state; an adjustment module 330 configured to re-plan a path for the robot to avoid the next sub-area and guide the robot to move according to the re-planned path in response to detecting that the current sub-area is in the unlocked state and the next sub-area is in the locked state; and a moving module 340 configured to guide the robot to move according to the path when detecting that the current sub-area and the next sub-area are both in the unlocked state.

In some embodiments, the device further includes a buffer module configured to: re-plan a path for the robot to avoid the next sub-area and guide the robot to move according to the re-planned path in response to detecting that the current sub-area is in the buffer state and the next sub-area is in the locked state; and guide the robot to move according to the path when detecting that the current sub-area and the next sub-area are both in the buffer state, the current sub-area is in the unlocked state and the next sub-area is in the buffer state, or the current sub-area is in the buffer state and the next sub-area is in the unlocked state.

In some embodiments, the device further includes a setting module configured to: in response to a working state setting instruction, set the working state of at least one sub-area specified by the working state setting instruction as the state specified by the working state setting instruction.

In some embodiments, the setting module is configured to: in response to the operation of pressing a working state setting option of any sub-area, set the working state of the sub-area as a specified state, or in response to the operation of inputting coordinates of any sub-area, set the working state of the sub-area as a specified state.

In some embodiments, the device further includes an obstacle module configured to: in response to detecting that there is a moving obstacle in the path, set the sub-area with the moving obstacle to the locked state.

In some embodiments, the adjustment module 330 is configured to: determining whether the next sub-area is still in the locked state after a preset time duration in response to detecting that the current sub-area of the robot in the path is in the unlocked state and the next sub-area is in the locked state; and re-plan a path for the robot to avoid the next sub-area and guide the robot to move according to the re-planned path when the next sub-area is still in the locked state after the preset time duration.

In some embodiments, the device further includes a full-field lock module configured to: control all robots in the working area to stop moving in response to a full-field lock operation.

The robot path control device provided in the embodiment of the present application can perform the robot path control method provided in any embodiment of the present application, and has the corresponding functional modules performing the method and beneficial effects.

Figure 11:
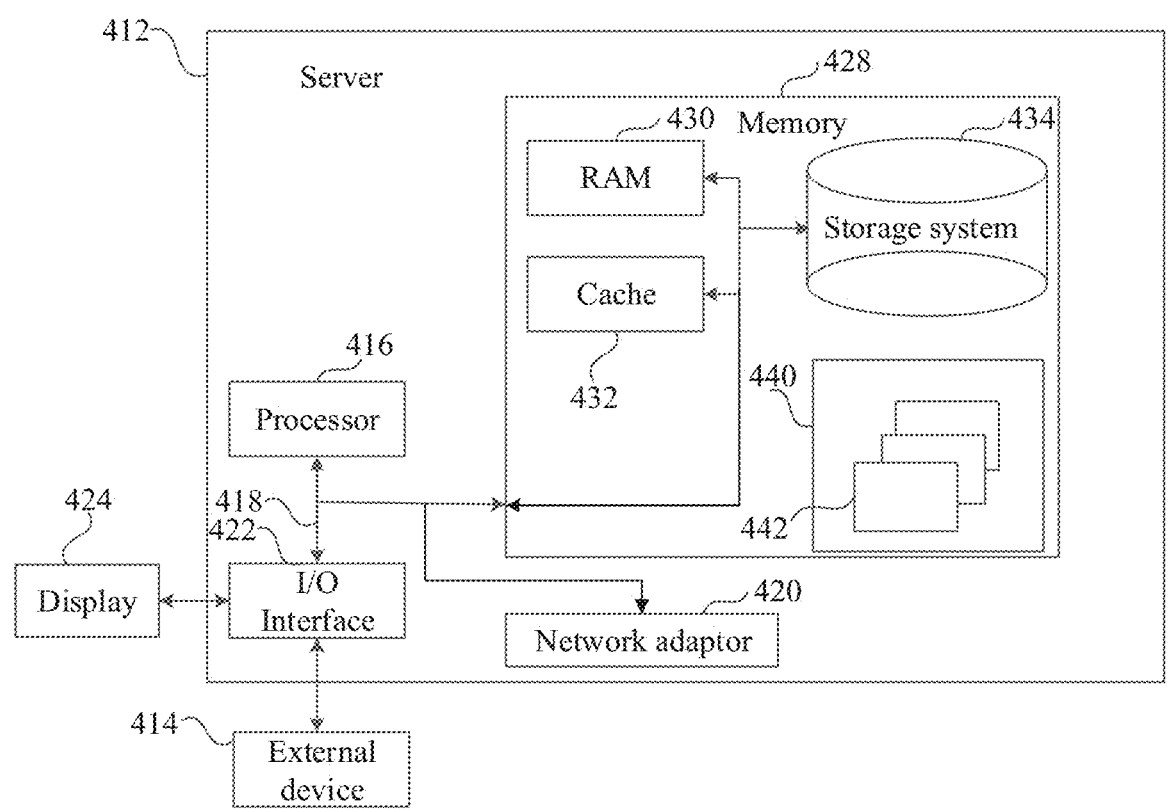
FIG. 11 is a structural schematic diagram of another server in an embodiment.

FIG. 11 is a structural schematic diagram of another server in an embodiment. FIG. 11 shows a block diagram of an exemplary server 412 suitable for implementing the embodiments of the present application. The server 412 shown in FIG. 11 is only one example, and should not bring any limitation to the functions and usage scope of the embodiments of the present application.

As shown in FIG. 11, the server 412 is represented in the form of a general-purpose terminal, The components of the server 412 may include but not limited to: one or more processors 416, a memory 428, and a bus 418 connecting different system components (including the memory 428 and the processor 416).

The bus 418 represents one or more of several types of bus structures, including a memory bus or a memory controller, a peripheral bus, a graphics acceleration port, a processor, or a local bus using any of multiple bus structures. For example, these architectures include but not limited to: ISA bus, MCA bus, enhanced ISA bus, VESA local bus, and PCI bus.

In some embodiments, the server 412 includes a variety of computer system readable media. These media can be any available media that can be accessed by the server 412, including volatile and non-volatile media, removable and non-removable media.

The memory 428 may include a computer system readable medium in the form of volatile memory, such as an RAM 430 and/or a cache memory 432. The server 412 may include other removable/non-removable, volatile/nonvolatile computer system storage media. Merely as an example, the storage system 434 may be used to read from and write to the non-removable and non-volatile magnetic media (not shown in FIG. 11, and commonly referred to as "hard drives"). Although not shown in FIG. 11, a magnetic disk drive for reading from and writing to a removable and non-volatile magnetic disk (such as "floppy disk") and an optical disk drive for reading from and writing to a removable and non-volatile optical disk (such as CD-ROM, DVD-ROM or other optical media) may be provided. In these cases, each drive may be connected to the bus 418 through one or more data medium interfaces. The memory 428 may include at least one program product that has a set of (for example, at least one) program modules configured to perform the functions of any embodiment of the present application.

A program/utility tool 440 having a set of (at least one) program modules 442 can be stored in, for example, the memory 428. Such program module 442 includes but not limited to: operating system, one or more application programs, other program modules and program data. Each or a combination of these examples may include the realization of a network environment. The program module 442 generally executes the functions and/or methods in the described embodiments of the present application.

The server 412 may also communicate with one or more external devices 414 (such as keyboard, pointing device, display 424, etc.), and may also communicate with one or more devices that enable users to interact with the server 412, and/or communicate with any device (e.g., network card, modem, etc.) that enables the server 412 to communicate with one or more other computing devices. Such communication may be performed through an input/output (I/O) interface 422. In addition, the server 412 may also communicate with one or more networks (for example, LAN, WAN and/or public network such as Internet) through a network adapter 420. As shown in FIG. 11, the network adapter 420 communicates with other modules of the server 412 through the bus 418. It should be understood that, although not shown in FIG. 11, other hardware and/or software modules can be used in conjunction with the server 412, including but not limited to: microcode, terminal driver, redundant processor, external disk drive array, RAID system, tape drive, and data backup storage system, etc.

The processor 416 executes a variety of functional applications and data processing by running the programs stored in the system memory 428, for example, to implement the robot path control method provided by the embodiments of the present application. This method includes: determining the working state of the current sub-area where the robot is located in the process during which the robot moves according to a planned path; when detecting that the current sub-area is in the locked state, controlling the robot to stop moving; when detecting that the current sub-area is in the unlocked state and the next sub-area is in the locked state, re-planning a path for the robot to avoid the next sub-area, and guiding the robot to move according to the re-planned path; and when detecting that the current sub-area and the next sub-area are both in the unlocked state, guiding the robot to move according to the path.

An embodiment of the present application further provides a computer-readable storage medium on which a computer program is stored, where the program, when executed by a processor, implements the robot path control method as provided in the embodiments of the present application. This method includes: determining the working state of the current sub-area where the robot is located in the process during which the robot moves according to a planned path; in response to detecting that the current sub-area is in the locked state, controlling the robot to stop moving; in response to detecting that the current sub-area is in the unlocked state and the next sub-area is in the locked state, re-planning a path for the robot to avoid the next sub-area, and guiding the robot to move according to the re-planned path; and in response to detecting that the current sub-area and the next sub-area are both in the unlocked state, guiding the robot to move according to the path.

The computer storage media of the embodiment of the present application may adopt any combination of one or more computer-readable media. The computer-readable medium may be a computer-readable signal medium or a computer-readable storage medium. The computer-readable storage medium may be, for example but not limited to, electrical, magnetic, optical, electromagnetic, infrared, or semiconductor system, apparatus or device, or any combination thereof. Examples of the computer-readable storage media (non-exhaustive list) include: electrical connection with one or more wires, portable computer disk, hard disk, RAM, ROM, EPROM or flash memory, optical fiber, portable CD-ROM, optical storage device, magnetic storage device, or any suitable combination thereof. In this document, the computer-readable storage medium can be any tangible medium that contains or stores a program, Where the program can be used by or used in combination with the instruction execution system, apparatus or device.

The computer-readable signal medium may include data signals propagated in the baseband or as a part of carrier waves, and the computer-readable signal medium bears the computer-readable program codes. Such propagated data signals can be in many forms, including but not limited to electromagnetic signals, optical signals, or any suitable combination thereof The computer-readable signal medium may also be any computer-readable medium other than the computer-readable storage medium, and the computer-readable medium may send, propagate or transmit the programs used by or used in combination with the instruction execution system, apparatus or device.

The program codes contained on the computer-readable medium can be transmitted by any suitable medium, including but not limited to wireless, wire, optical cable, RF, etc., or any suitable combination thereof.

The computer program codes for performing the operations of the present invention can be compiled in one or more programming languages or a combination of multiple programming languages, where the programming languages include the object-oriented programming languages such as Java, Smalltalk, C++, and also include the conventional procedural programming languages such as "C" language or similar programming languages. The program codes can be executed entirely on a user computer, executed partly on a user computer, executed as an independent software package, executed partly on a user computer and partly on a remote computer, or executed entirely on a remote computer or server. In the case of a remote computer, the remote computer can be connected to the user computer through any kind of network including LAN or WAN, or can be connected to an external computer (for example, using the Internet service provider to connect via the Internet).

Figure 12:
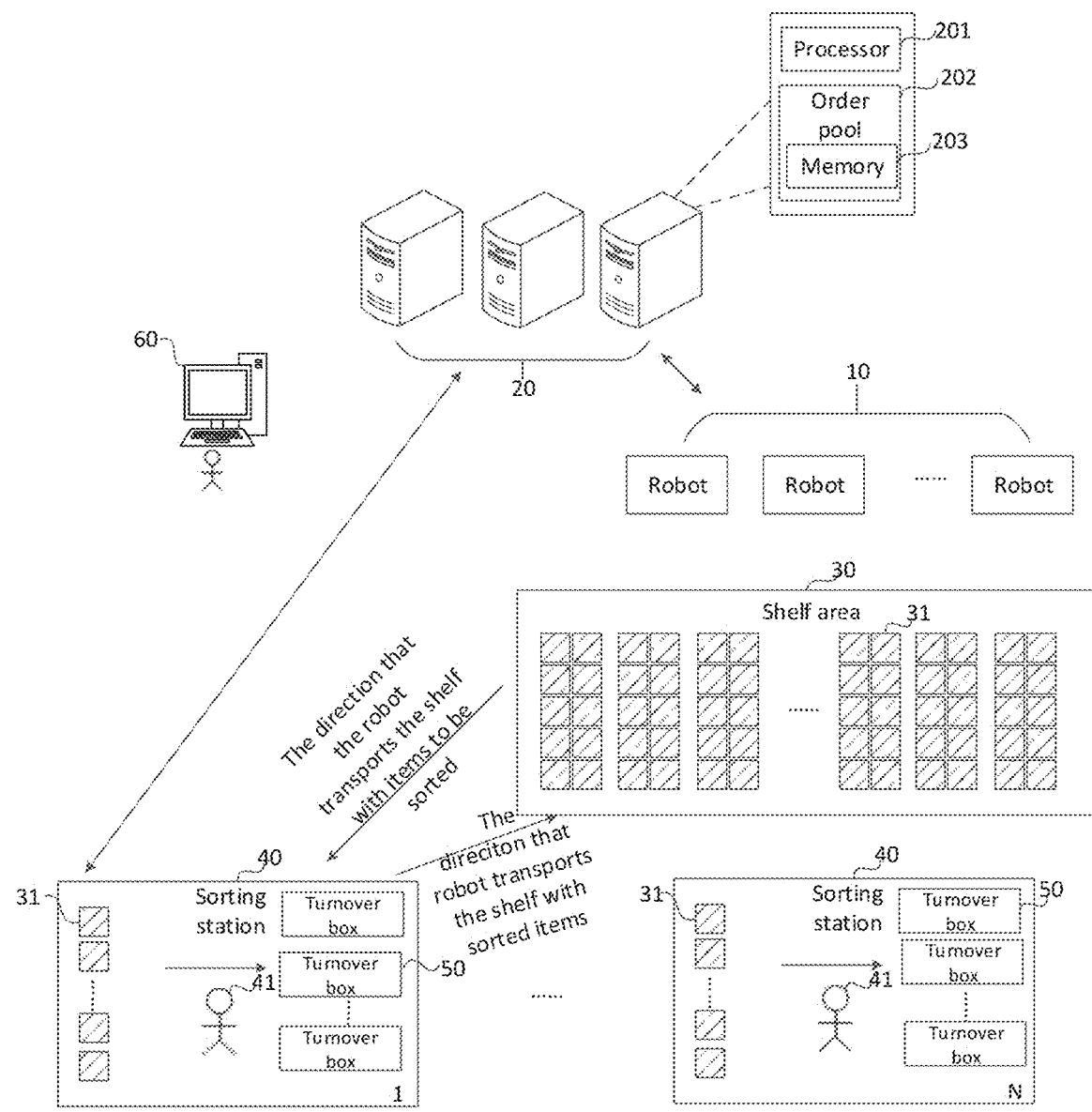
FIG. 12 is a schematic diagram of the system structure of a goods sorting system in an embodiment.

Please referring to the schematic diagram of the system structure of the goods sorting system shown in FIG. 12, the goods sorting system includes: self-driven robots 10, a control system 20, a shelf area 30 and a sorting station 40. The shelf area 30 is provided with multiple shelves 31 on which many kinds of goods are placed. For example, like the shelves with many kinds of goods we see in a supermarket, the shelves 31 are arranged in the form of a shelf array.

The control system 20 performs the wireless communications with the self-driven robots 10, the staff makes the control system 20 work through a console 60, and the self-driven robots 10 perform the goods transport tasks under the control of the control system 20. For example, the control system 20 plans a movement path for a self-driven robot 10 according to the transport task, and the self-driven robot 10 travels along the empty space (a part of the passage of the self-driven robot 10) in the shelf array according to the movement path. In order to facilitate the planning of the movement path for the self-driven robot 10, the working area (that includes at least the shelf area 30 and the area where the sorting station 40 is located) of the self-driven robot 10 is divided into multiple sub-areas (i.e., cells) in advance, and the self-driven robot 10 moves in the sub-areas one by one to form the movement trajectory.

The self-driven robot 10 can move below the target shelf 31, lift the target shelf 31 by the lifting mechanism, and transport it to the assigned sorting station 40. In one example, the self-driven robot 10 has a lifting mechanism and has the autonomous navigation function. The self-driven robot 10 can move below the target shelf 31 and use the lifting mechanism to lift the entire shelf 31, so that the shelf 31 can move up and down along with the lifting mechanism with the lifting function. In one example, the self-driven robot 10 can drive forward according to the two-dimensional code information captured by the camera, and can drive below the shelf 31 indicated by the control system 20 according to the path determined by the control system 20. The self-driven robot 10 transports the target shelf 31 to the sorting station 40, where the staff 41 or the sorting robot picks the goods from the shelf 31 and puts them in the turnover boxes 50 for package.

The control system 20 is a software system that runs on a server and has the data storage and information processing capabilities, and can be connected to robots, hardware input system and other software systems in a wireless or wired way. The control system 20 may include one or more servers, and may be a centralized control architecture or a distributed computing architecture. The server has a processor 201 and a memory 202, and there may be an order pool 203 in the memory 202.

In the goods sorting system, once a fire alarm occurs, the self-driven robots 10 need to be quickly moved away from the area where the fire engine acess is located, so as to provide the necessary guarantee for smooth rescue. Therefore, the present application provides a fire control scheme for the self-driven robots 10.

Figure 13:
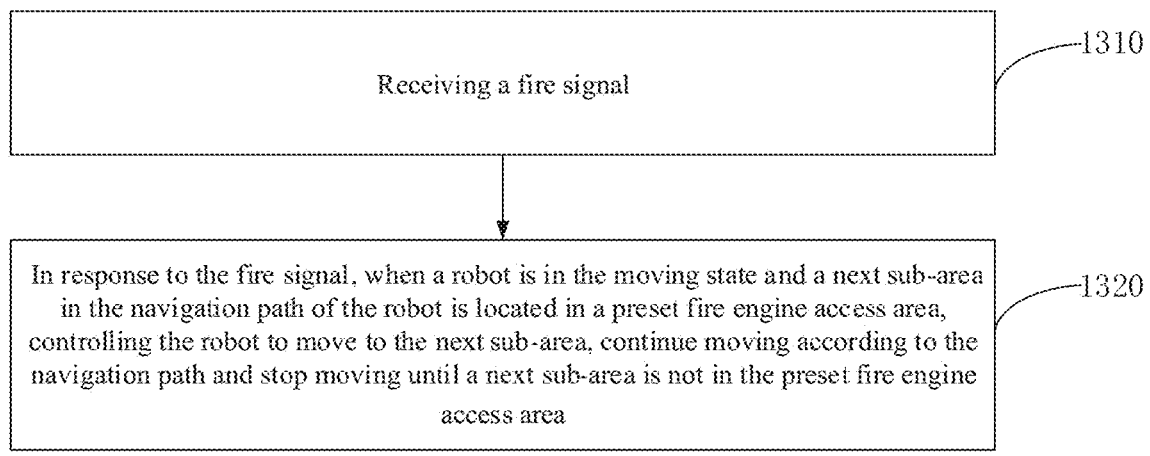
FIG. 13 is a flowchart of a robot scheduling method in an embodiment.

FIG. 13 is a flowchart of a robot scheduling method in an embodiment. This embodiment is applicable to the fire control case of robots, and the method can be performed by a robot scheduling device which can be implemented by software and/or hardware. For example, the device may be configured in a server where the control system 20 runs. The method may include the following steps.

Operation 1310: receiving a fire signal.

The fire signal can be triggered by the fire scram button. In some embodiments, the fire scram button may be preset, or may be implemented by hardware or software. Exemplarily, the hub (HUB) of the fire scram button and the server adopt the Socket communication, and the data has a fixed length of 34 bytes, of which 4 bytes represent the state of the fire scram button access to the HUB. The first 1 to 8 channels represent the fire scram button. If the server detects that a signal comes from the first 1 to 8 channels, it can determine that the fire signal is received. Here, the application program usually sends requests to the network or responds to network requests via "socket". Socket is used when establishing a network connection. When the connection is successful, the application program will generate one Socket instance at both ends, operate this instance, and complete the required session.

The server can also obtain the external fire signal transmitted through the standard interface. Exemplarily, the instruction format of the interface transmission may be {instruction: FIRE_STOP}.

Operation 1320: in response to the fire signal, when a robot is in the moving state and a next sub-area in the navigation path of the robot is located in a preset fire engine access area, controlling the robot to move to the next sub-area, continue moving according to the navigation path and stop moving until a next sub-area is not in the preset fire engine access area.

Figure 14:
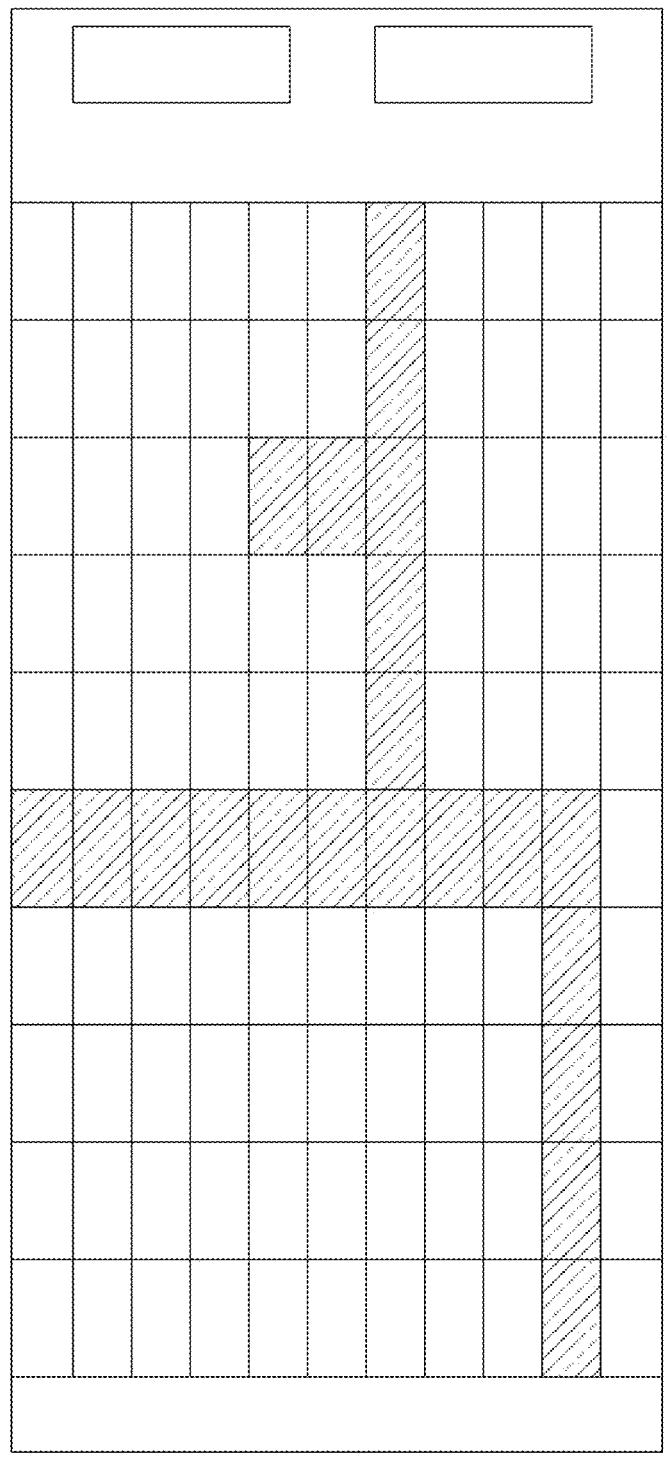
FIG. 14 is a schematic diagram of fire engine access in an embodiment.

In some embodiments, the navigation path is the best path planned in advance according to the destination of the robot. In this embodiment, the working area of the robot on the map is divided into multiple sub-areas (or called cells) as needed in advance, and multiple consecutive sub-areas can form the movement path of the robot, so the sub-areas through which the robot needs to move are planned in the navigation path. The types of the sub-areas can be defined according to business functions, for example, the shelf sub-area or working state sub-area is defined. In some embodiments, the setting of the fire engine access area is independent of the type definition of the sub-areas, that is, different types of sub-areas can be set as the fire engine access area, and the sub-areas where the fire engine access is located or the sub-areas where the fire door is located can be set as the fire engine access area. In some embodiments, the normalized coordinates of the fire engine access area can be listed in the Comma-Separated Values (CSV) format in the xml file of the map. Exemplarily, <firepass>146,9, 146,10, 146,11, 146,12, 146,13, 146,14, 146,15, 146,16, 146,17, 146,18, . . . (omit some configurations) 137,60, 137, 61, 137,62, 137,63, 137,64, 137,65, 137,66, 137,67 </firepass>. FIG. 14 is a schematic diagram of a fire engine access area in an embodiment. As shown in FIG. 14, the sub-areas marked by diagonal lines form the fire engine access area.

In some embodiments, in response to the fire signal, when a robot is in the moving state and a next sub-area in the navigation path of the robot is located in a preset fire engine access area, the robot is controlled to move to the next sub-area and it is determined whether the yet next sub-area is located in the preset fire engine access area. When the yet next sub-area is not located in the preset fire engine access area, the robot is controlled to stop moving; and when the yet next sub-area is located in the preset fire engine access area, the robot is controlled to continue moving according to the navigation path and stop moving until a certain sub-area is not in the preset fire engine access area.

In some embodiments, after receiving the fire signal, and when the robot is in the stopping state and the sub-area where the robot is currently located is in the preset fire engine access area, a navigation path is re-planned for the robot and the robot is controlled to move along the re-planned navigation path to leave from the preset fire engine access area. In some embodiments, a transfer-out destination is selected for the robot based on the distance between the robot and the transfer-out destination and/or the robot density within a predetermined area coverage where the transfer-out destination is located; a navigation path is re-planned for the robot according to the selected transfer-out destination, and the robot is controlled to move to the selected transfer-out destination along the re-planned navigation path. Exemplarily, if the sub-area where the robot stays currently is located in the preset fire engine access area, a sub-area with the distance of no more than 4 sub-areas and with only one robot in adjacent sub-areas can be selected as the transfer-out destination, the losses of multiple paths are recalculated, the path with the least loss is taken as the re-planned navigation path, and the robot is controlled to move to the transfer-out destination according to the re-planned navigation path. In some embodiments, when the height below the shelf can allow the robot to move, the transfer-out destination can also be a shelf sub-area.

In this embodiment, if the robot is in the moving state and the sub-areas (including the destination) through which the robot passes in the navigation path are all located in the preset fire engine access area, then it is also possible, after the robot reaches the destination, to re-plan a navigation path for the robot and control the robot to move along the re-planned navigation path to leave from the destination.

In the technical solution of this embodiment, a fire signal is received, and in response to the fire signal, if the robot is in the moving state and the next sub-area in the navigation path of the robot is located in the preset fire engine access area, then the robot is controlled to move to the next sub-area, continue moving according to the navigation path and stop moving until the next sub-area is not in the preset fire engine access area. The technical solution provided by the embodiment of the present application can avoid the problems caused by delay errors or sudden braking, and improve the efficiency of the robot leaving from the fire engine access.

Figure 15:
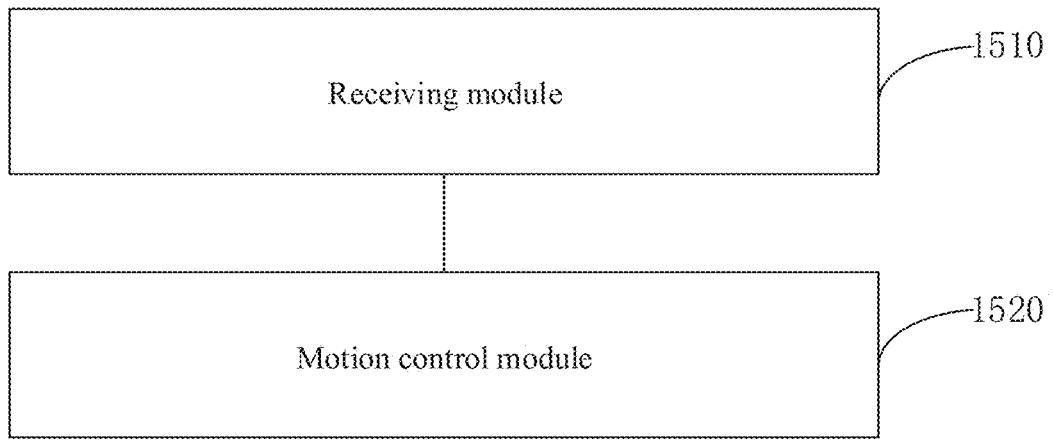
FIG. 15 is a structural schematic diagram of a robot scheduling device in an embodiment.

FIG. 15 is a structural schematic diagram of a robot scheduling device in an embodiment. The device may include: a receiving module 1510 configured to receive a fire signal; and a motion control module 1520 configured to, in response to the fire signal, control a robot to move to the next sub-area and continue moving according to the navigation path in the case when the robot is in the moving state and the next sub-area in the navigation path of the robot is located in a preset fire engine access area, and stop moving until the next sub-area is not in the preset fire engine access area.

In some embodiments, the device may further include a stop control module configured to: re-plan a navigation path for the robot and control the robot to move along the re-planned navigation path to leave from the preset fire engine access area when the robot is in the stopping state and the sub-area where the robot is currently located is in the preset fire engine access area.

In some embodiments, the stop control module is configured to re-plan the navigation path for the robot and control the robot to move along the re-planned navigation path to leave from the preset fire engine access area by way of: selecting a transfer-out destination for the robot based on the distance between the robot and the transfer-out destination and/or the robot density within a predetermined area coverage where the transfer-out destination is located; re-planning a navigation path for the robot according to the selected transfer-out destination, and controlling the robot to move to the selected transfer-out destination along the re-planned navigation path.

In some embodiments, the fire signal is triggered by a fire scram button or received via an external interface.

In the technical solution provided in this embodiment, the fire signal can be received by a scram hardware system, and the fire signal is transmitted to the server through a scram system controller. After the server receives the fire signal, the robot scheduling system will control all robots to stop working and leave from the fire sub-areas. This embodiment can avoid the problems caused by delay errors or sudden braking, and improve the efficiency of the robot leaving from the fire engine access.

The robot scheduling device provided in the embodiment of the present application can perform the robot scheduling method provided in any embodiment of the present application, and has the corresponding functional modules performing the method and beneficial effects.

Figure 16:
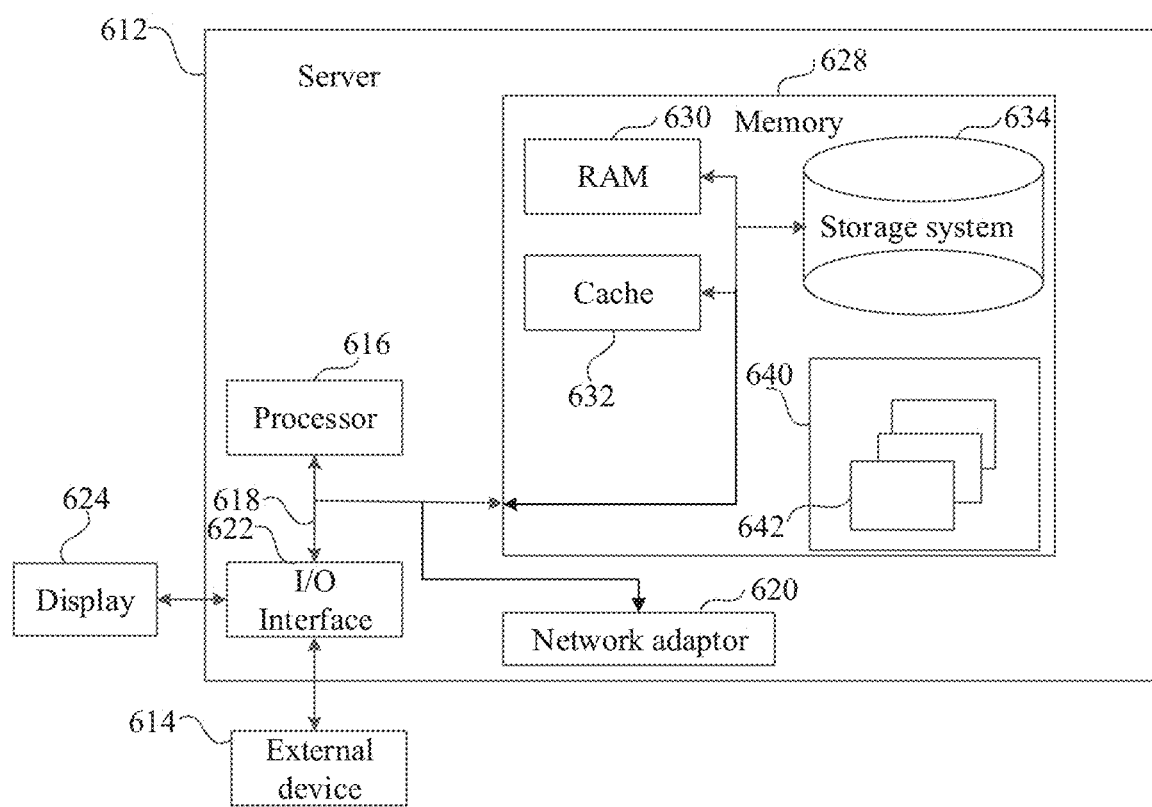
FIG. 16 is a structural schematic diagram of another server in an embodiment.

FIG. 16 is a structural schematic diagram of another server in an embodiment. FIG. 16 shows a block diagram of an exemplary server 612 suitable for implementing the embodiments of the present application. The server 612 shown in FIG. 16 is only one example, and should not bring any limitation to the functions and usage scope of the embodiments of the present application.

As shown in FIG. 16, the server 612 is represented in the form of a general-purpose server. The components of the server 612 may include but not limited to: one or more processors 616, a system memory 628, and a bus 618 connecting different system components (including the system memory 628 and the processor 616).

The bus 618 represents one or more of several types of bus structures, including a memory bus or a memory controller, a peripheral bus, a graphics acceleration port, the processor 616, or a local bus using any of multiple bus structures. For example, these architectures include but not limited to: ISA bus, MCA bus, enhanced ISA bus, VESA local bus, and PCI bus.

In some embodiments, the server 612 includes a variety of computer system readable media. These media can be any available media that can be accessed by the server 612, including volatile and non-volatile media, removable and non-removable media.

The system memory 628 may include a computer system readable medium in the form of volatile memory, such as an RAM 630 and/or a cache memory 632. The server 612 may include other removable/non-removable, volatile/nonvolatile computer system storage media. Merely as an example, the storage system 634 may be used to read from and write to the non-removable and non-volatile magnetic media (not shown in FIG, 16, and commonly referred to as "hard drives"), Although not shown in FIG. 16, a magnetic disk drive for reading from and writing to a removable and non-volatile magnetic disk (such as "floppy disk") and an optical disk drive for reading from and writing to a removable and non-volatile optical disk (such as CD-ROM, DVD-ROM or other optical media) may be provided. In these cases, each drive may be connected to the bus 618 through one or more data medium interfaces. The memory 628 may include at least one program product that has a set of (for example, at least one) program modules configured to perform the functions of any embodiment of the present application.

A program/utility tool 640 having a set of (at least one) program modules 642 can be stored in, for example, the memory 628. Such program module 642 includes but not limited to: operating system, one or more application programs, other program modules and program data. Each or a combination of these examples may include the realization of a network environment. The program module 642 generally executes the functions and/or methods in the described embodiments of the present application.

The server 612 may also communicate with one or more external devices 614 (such as keyboard, pointing device, display 624, etc.), and may also communicate with one or more devices that enable users to interact with the server 612, and/or communicate with any device (e.g., network card, modem, etc.) that enables the server 612 to communicate with one or more other computing devices. Such communication may be performed through an input/output (I/O) interface 622. In addition, the server 612 may also communicate with one or more networks (for example, LAN, WAN and/or public network such as Internet) through a network adapter 620. As shown in FIG. 16, the network adapter 620 communicates with other modules of the server 612 through the bus 618. It should be understood that, although not shown in FIG. 16, other hardware and/or software modules can be used in conjunction with the server 612, including but not limited to: microcode, device driver, redundant processing unit, external disk drive array, RAID system, tape drive, and data backup storage system, etc.

The processor 616 executes a variety of functional applications and data processing by running the programs stored in the system memory 628, for example, to implement the robot scheduling method provided by the embodiments of the present application. This method includes: receiving a fire signal; in response to the fire signal, when a robot is in the moving state and the next sub-area in the navigation path of the robot is located in a preset fire engine access area, controlling the robot to move to the next sub-area, continue moving according to the navigation path and stop moving until the next sub-area is not in the preset fire engine access area.

Embodiments of the present application further provide a computer-readable storage medium on which a computer program is stored, where the program, when executed by a processor, implements the robot scheduling method as provided in the embodiments of the present application. This method includes: receiving a fire signal; in response to the fire signal, when a robot is in the moving state and the next sub-area in the navigation path of the robot is located in a preset fire engine access area, controlling the robot to move to the next sub-area, continue moving according to the navigation path and stop moving until the next sub-area is not in the preset fire engine access area.

The computer storage media of the embodiment of the present application may adopt any combination of one or more computer-readable media. The computer-readable medium may be a computer-readable signal medium or a computer-readable storage medium. The computer-readable storage medium may be, for example but not limited to, electrical, magnetic, optical, electromagnetic, infrared, or semiconductor system, apparatus or device, or any combination thereof. Examples of the computer-readable storage media (non-exhaustive list) include: electrical connection with one or more wires, portable computer disk, hard disk, RAM, ROM, EPROM or flash memory, optical fiber, portable CD-ROM, optical storage device, magnetic storage device, or any suitable combination thereof. In this document, the computer-readable storage medium can be any tangible medium that contains or stores a program, where the program can be used by or used in combination with the instruction execution system, apparatus or device.

The computer-readable signal medium may include data signals propagated in the baseband or as a part of carrier waves, and the computer-readable signal medium bears the computer-readable program codes. Such propagated data signals can be in many forms, including but not limited to electromagnetic signals, optical signals, or any suitable combination thereof. The computer-readable signal medium may also be any computer-readable medium other than the computer-readable storage medium, and the computer-readable medium may send, propagate or transmit the programs used by or used in combination with the instruction execution system, apparatus or device.

The program codes contained on the computer-readable medium can be transmitted by any suitable medium, including but not limited to wireless, wire, optical cable, RF, etc., or any suitable combination thereof.

The computer program codes for performing the operations of the present application can be compiled in one or more programming languages or a combination of multiple programming languages, where the programming languages include the Object-oriented programming languages such as Java, Smalltalk, C++, and also include the conventional procedural programming languages such as "C" language or similar programming languages. The program codes can be executed entirely on a user computer, executed partly on a user computer, executed as an independent software package, executed partly on a user computer and partly on a remote computer, or executed entirely on a remote computer or server. In the case of a remote computer, the remote computer can be connected to the user computer through any kind of network including LAN or WAN, or can be connected to an external computer (for example, using the Internet service provider to connect via the Internet).

What is claimed is:

1. A robot scheduling method, comprising:
   receiving, by an operating terminal, a scheduling instruction input by a user;
   determining, by a server, a working state and a current position of a robot in a working area in response to the scheduling instruction, wherein the working state comprises an idle state and a non-idle state;
   in response to the working state of the robot being the idle state and the current position being outside a preset target range, determining whether a number of robots in the preset target range is greater than a number of robots that can be accommodated in the preset target range;
   generating, by the server, a work instruction to schedule the robot to move from the current position into the preset target range when the number of robots in the preset target range is not greater than the number of robots that can be accommodated in the preset target range, and to schedule the robot to move from the current positions to a re-determined new target range when the number of robots in the preset target range is greater than the number of robots that can be accommodated in the preset target range; and wirelessly transmitting, by the server, the work instruction to the robot.

2. The method according to claim 1, wherein the determining of the working state of the robot in the working area, comprises:

determining whether the robot in the work area has a task to be performed or a task in progress;

in response to determining that the robot has neither the task to be performed nor the task in progress, determining that the working state of the robot is the idle state; and in response to determining that the robot has the task to be performed or the task in progress, determining that the working state of the robot is the non-idle state.

3. The method according to claim 1, wherein the generating of the work instruction, comprises:

determining a target position of the robot within the target range;

calculating a best path from the current position to the target position;

scheduling the robot from the current position to the target position according to the best path.

4. The method according to claim 3, wherein the determining of the target position of the robot within the target range, comprises:

determining a planned position of the robot within the target range;

determining whether the planned position of the robot satisfies a preset scheduling condition, and determining the planned position of the robot as the target position of the robot in response to determining that the planned position of the robot satisfies the scheduling condition.

5. The method according to claim 4, wherein the target range is divided into at least one cell, and the target position of the robot is determined in units of cells; wherein a shape of the target range is a rectangle, the target range is determined by a preset start position, a width and a height.

6. The method according to claim 5, wherein the preset scheduling condition comprises:

in a case that the robot is arranged vertically, cells adjacent horizontally to the planned position of the robot are in idle state;

in a case that the robot is arranged horizontally, cells adjacent vertically to the planned position of the robot are in idle state.

7. A server, comprising:

at least one processor;

a memory configured to store at least one program;

when the at least one program is executed by the at least one processor, the at least one processor realizes operations of:

receiving a scheduling instruction input by a user at an operating terminal;

determining a working state and a current position of a robot in a working area in response to the scheduling instruction, wherein the working state comprises an idle state and a non-idle state;

in response to the working state of the robot being the idle state and the current position being outside a preset target range, determining whether a number of robots in the preset target range is greater than a number of robots that can be accommodated in the preset target range;

generating a work instruction to schedule the robot to move from the current position into the preset target range when the number of robots in the preset target range is not greater than the number of robots that can be accommodated in the preset target range, and to schedule the robot to move from the current positions to a re-determined new target range when the number of robots in the preset target range is greater than the number of robots that can be accommodated in the preset target range; and wirelessly transmitting, by the server, the work instruction to the robot.

* * * * *